(12) United States Patent
Park et al.

(10) Patent No.: US 12,540,180 B2
(45) Date of Patent: Feb. 3, 2026

(54) ANTIBODY AGAINST c-KIT AND USE THEREOF

(71) Applicant: NOVELTY NOBILITY INC., Seongnam-si (KR)

(72) Inventors: Sang Gyu Park, Seongnam-si (KR); Kwang-Hyeok Kim, Suwon-si (KR); Jin-Ock Kim, Seongnam-si (KR)

(73) Assignee: NOVELTY NOBILITY INC., Seongnam-si (KR)

( * ) Notice: Subject to any disclaimer, the term of this patent is extended or adjusted under 35 U.S.C. 154(b) by 908 days.

(21) Appl. No.: 17/779,349

(22) PCT Filed: Nov. 24, 2020

(86) PCT No.: PCT/KR2020/016704
§ 371 (c)(1),
(2) Date: May 24, 2022

(87) PCT Pub. No.: WO2021/107566
PCT Pub. Date: Jun. 3, 2021

(65) Prior Publication Data
US 2022/0411502 A1     Dec. 29, 2022

(30) Foreign Application Priority Data
Nov. 25, 2019 (KR) .......................... 10-2019-0152304

(51) Int. Cl.
*C07K 16/28*     (2006.01)
*C12N 5/00*     (2006.01)
*C12P 21/02*     (2006.01)

(52) U.S. Cl.
CPC ............ *C07K 16/2803* (2013.01); *C12N 5/00* (2013.01); *C12P 21/02* (2013.01)

(58) Field of Classification Search
None
See application file for complete search history.

(56) References Cited

U.S. PATENT DOCUMENTS

2012/0288506 A1    11/2012    Amatulli et al.

FOREIGN PATENT DOCUMENTS

| CN | 110256559 A | 9/2019 | |
|---|---|---|---|
| JP | 9-154578 A | 6/1997 | |
| KR | 10-1110547 B1 | 2/2012 | |
| WO | 03/004006 A2 | 1/2003 | |
| WO | 2012/154480 A1 | 11/2012 | |
| WO | 2014/150937 A1 | 9/2014 | |
| WO | 2019/084067 A1 | 5/2019 | |
| WO | 2019/155067 A1 | 8/2019 | |
| WO | WO-2020041540 A1 * | 2/2020 | ......... C07K 16/1018 |
| WO | WO-2021216731 A1 * | 10/2021 | ............. A61K 35/17 |

OTHER PUBLICATIONS

MW Dictionary. Definitiono of "Prevent". Printed Apr. 24, 2025. (Year: 2025).*
American Cancer Society. Cancer Risk and Prevention. Website printed Apr. 24, 2025. (Year: 2025).*
Mendola et al. Angiogenesis in Disease. Int. J. Mol. Sci. 2022, 23, 10962. https://doi.org/10.3390/ijms231810962. (Year: 2022).*
Sela-Culang. Sela-Culang et al. The structural basis of antibody-antigen recognition. Fron. Immuno., vol. 4, Article 302, Oct. 2013. (Year: 2013).*
Koenig. Mutational landscape of antibody variable domains reveals a switch modulating the interdomain conformational dynamics and antigen binding. PNAS, E486-E4995, Jan. 5, 2017. (Year: 2017).*
Herold. Determinants of the assembly and function of antibody variable domains. Nature Scientific Reports, 7:12276, Sep. 25, 2017.(Year: 2017).*
Herold et al. Determinants of the assembly and function of antibody variable domains. Nature Scientific Reports, 7:12276, Sep. 25, 2017. (Year: 2017).*
Blechman et al., "Soluble c-kit proteins and antireceptor monoclonal antibodies confine the binding site of the stem cell factor," The Journal of Biological Chemistry, Feb. 25, 1993, vol. 268, No. 6, 4399-4406, 8 pages total.
Matsui et al., "Stem cell factor/c-kit signaling promotes the survival, migration, and capillary tube formation of human umbilical vein endothelial cells," The Journal of Biological Chemistry, Apr. 30, 2004, vol. 279, No. 18, 18600-18607, 9 pages total.
Maria B Lebron et al., "A human monoclonal antibody targeting the stem cell factor receptor (c-Kit) blocks tumor cell signaling and inhibits tumor growth", Cancer Biology & Therapy, Taylor & Francis, Sep. 2014, pp. 1208-1218, vol. 15, Issue 9.
Andrew J. Garton et al., "Anti-kit Monoclonal Antibody Treatment Enhances the Anti-Tumor Activity of Immune Checkpoint Inhibitors by Reversing Tumor-Induced Immunosuppression", Molecular Cancer Therapeutics, Jan. 30, 2017 (online publication date), 34 pages, vol. 16, No. 4.
Peter Carmeliet et al., "Angiogenesis in cancer and other diseases", Nature, Sep. 14, 2000, pp. 249-257, vol. 407.
International Search Report for PCT/KR2020/016704, dated Mar. 2, 2021.
Maryam Abbaspour Babaei, et al., "Receptor tyrosine kinase (c-KIT) inhibitors: a potential therapeutic target in cancer cells," Drug Design, Development and Therapy, Dovepress, 2016, vol. 10, pp. 2443-2459 (17 pages total).

(Continued)

*Primary Examiner* — Julie Wu
*Assistant Examiner* — Amy M. Chattin
(74) *Attorney, Agent, or Firm* — Sughrue Mion, PLLC

(57) ABSTRACT

The present disclosure relates to an antibody against c-kit or antigen-binding fragment thereof, a nucleic acid encoding the same, a vector including the nucleic acid, a cell transformed with the vector, a method for producing the antibody or antigen-binding fragment thereof, a composition for preventing or treating an angiogenic disease containing the same, and a composition for preventing or treating cancer.

17 Claims, 9 Drawing Sheets

Specification includes a Sequence Listing.

(56) References Cited

OTHER PUBLICATIONS

Olgasi et al., "DNA vaccination against membrane-bound Kit ligand: A new approach to inhibiting tumour growth and angiogenesis", European Journal of Cancer, 2014, vol. 50, pp. 234-246 (13 pages total).
Yuzawa et al., "Structural Basis for Activation of the Receptor Tyrosine Kinase KIT by Stem Cell Factor", Cell, 2007, vol. 130, pp. 323-334 (12 pages total).

* cited by examiner

SEQUENCE LISTING

```
<160> NUMBER OF SEQ ID NOS: 11

<210> SEQ ID NO 1
<211> LENGTH: 5
<212> TYPE: PRT
<213> ORGANISM: Artificial Sequence
<220> FEATURE:
<223> OTHER INFORMATION: H-CDR1

<400> SEQUENCE: 1
```

Ser Tyr Tyr Trp Ser
1               5

<210> SEQ ID NO 2
<211> LENGTH: 16
<212> TYPE: PRT
<213> ORGANISM: Artificial Sequence
<220> FEATURE:
<223> OTHER INFORMATION: H-CDR2

<400> SEQUENCE: 2

Tyr Ile Phe Tyr Ser Gly Ser Thr Asn Tyr Asn Pro Ser Leu Lys Ser
1               5                   10                  15

<210> SEQ ID NO 3
<211> LENGTH: 11
<212> TYPE: PRT
<213> ORGANISM: Artificial Sequence
<220> FEATURE:
<223> OTHER INFORMATION: H-CDR3

<400> SEQUENCE: 3

Gly Tyr Ser Ser Gly Trp Leu Asp Phe His His
1               5                   10

<210> SEQ ID NO 4
<211> LENGTH: 11
<212> TYPE: PRT
<213> ORGANISM: Artificial Sequence
<220> FEATURE:
<223> OTHER INFORMATION: L-CDR1

<400> SEQUENCE: 4

Arg Ala Ser Gln Ser Ile Ser Ser Tyr Leu Asn
1               5                   10

<210> SEQ ID NO 5
<211> LENGTH: 7
<212> TYPE: PRT
<213> ORGANISM: Artificial Sequence
<220> FEATURE:
<223> OTHER INFORMATION: L-CDR2

<400> SEQUENCE: 5

Ala Ala Ser Ser Leu Gln Ser
1               5

<210> SEQ ID NO 6
<211> LENGTH: 9
<212> TYPE: PRT
<213> ORGANISM: Artificial Sequence
<220> FEATURE:
<223> OTHER INFORMATION: L-CDR3

<400> SEQUENCE: 6

Gln Gln Ser Tyr Ser Thr Pro Ile Thr
1               5

<210> SEQ ID NO 7
<211> LENGTH: 119
<212> TYPE: PRT
<213> ORGANISM: Artificial Sequence
<220> FEATURE:
<223> OTHER INFORMATION: VH

<400> SEQUENCE: 7

```
Gln Val Gln Leu Gln Glu Ser Gly Pro Gly Leu Val Lys Pro Ser Glu
1               5                   10                  15

Thr Leu Ser Leu Thr Cys Thr Val Ser Gly Gly Ser Ile Gly Ser Tyr
            20                  25                  30

Tyr Trp Ser Trp Ile Arg Gln Pro Pro Gly Lys Gly Leu Glu Trp Ile
        35                  40                  45

Gly Tyr Ile Phe Tyr Ser Gly Ser Thr Asn Tyr Asn Pro Ser Leu Lys
    50                  55                  60

Ser Arg Val Thr Ile Ser Val Asp Thr Ser Lys Asn Gln Phe Ser Leu
65                  70                  75                  80

Lys Leu Ser Ser Val Thr Ala Ala Asp Thr Ala Val Tyr Tyr Cys Ala
                85                  90                  95

Arg Gly Tyr Ser Ser Gly Trp Leu Asp Phe His His Trp Gly Gln Gly
            100                 105                 110

Thr Leu Val Ala Val Ser Ser
            115
```

<210> SEQ ID NO 8
<211> LENGTH: 107
<212> TYPE: PRT
<213> ORGANISM: Artificial Sequence
<220> FEATURE:
<223> OTHER INFORMATION: VL

<400> SEQUENCE: 8

```
Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Ser Ile Ser Ser Tyr
            20                  25                  30

Leu Asn Trp Tyr Gln Gln Lys Pro Gly Lys Ala Pro Lys Leu Leu Ile
        35                  40                  45

Tyr Ala Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Ser Tyr Ser Thr Pro Ile
                85                  90                  95

Thr Phe Gly Gln Gly Thr Arg Leu Glu Ile Lys
            100                 105
```

<210> SEQ ID NO 9
<211> LENGTH: 357
<212> TYPE: DNA
<213> ORGANISM: Artificial Sequence
<220> FEATURE:
<223> OTHER INFORMATION: VH

<400> SEQUENCE: 9

```
caggtgcagc tgcaggagtc gggcccagga ctggtgaagc cttcggagac cctgtccctc      60
acctgcactg tctctggtgg ctccatcggt agctactact ggagctggat ccggcagccc     120
ccagggaagg gactggagtg gattgggtat atctttttaca gtgggagcac caactacaac    180
ccctccctca gagtcgagt caccatatca gtagacacg ccaagaacca gttctccctg       240
aagctgagct ctgtgaccgc tgcggacacg gccgtgtatt actgtgcgag agggtatagc     300
agtggctggt tagacttcca ccactggggc cagggcaccc tggtcgccgt ctcctca        357
```

<210> SEQ ID NO 10

<211> LENGTH: 321
<212> TYPE: DNA
<213> ORGANISM: Artificial Sequence
<220> FEATURE:
<223> OTHER INFORMATION: VL

<400> SEQUENCE: 10

```
gacatccaga tgacccagtc tccatcctcc ctgtctgcat ctgtaggaga cagagtcacc    60
atcacttgcc gggcaagtca gagcattagc agctatttaa attggtatca gcagaaacca   120
gggaaagccc ctaagctcct gatctatgct gcatccagtt tgcaaagtgg ggtcccatca   180
aggttcagtg gcagtggatc tgggacagat ttcactctca ccatcagcag tctgcaacct   240
gaagattttg caacttacta ctgtcaacag agttacagta ccccgatcac cttcggccaa   300
gggacacgac tggagattaa a                                             321
```

<210> SEQ ID NO 11
<211> LENGTH: 976
<212> TYPE: PRT
<213> ORGANISM: Artificial Sequence
<220> FEATURE:
<223> OTHER INFORMATION: c-kit

<400> SEQUENCE: 11

```
Met Arg Gly Ala Arg Gly Ala Trp Asp Phe Leu Cys Val Leu Leu Leu
1               5                   10                  15

Leu Leu Arg Val Gln Thr Gly Ser Ser Gln Pro Ser Val Ser Pro Gly
            20                  25                  30

Glu Pro Ser Pro Pro Ser Ile His Pro Gly Lys Ser Asp Leu Ile Val
        35                  40                  45

Arg Val Gly Asp Glu Ile Arg Leu Leu Cys Thr Asp Pro Gly Phe Val
    50                  55                  60

Lys Trp Thr Phe Glu Ile Leu Asp Glu Thr Asn Glu Asn Lys Gln Asn
65                  70                  75                  80

Glu Trp Ile Thr Glu Lys Ala Glu Ala Thr Asn Thr Gly Lys Tyr Thr
                85                  90                  95

Cys Thr Asn Lys His Gly Leu Ser Asn Ser Ile Tyr Val Phe Val Arg
            100                 105                 110

Asp Pro Ala Lys Leu Phe Leu Val Asp Arg Ser Leu Tyr Gly Lys Glu
        115                 120                 125

Asp Asn Asp Thr Leu Val Arg Cys Pro Leu Thr Asp Pro Glu Val Thr
    130                 135                 140

Asn Tyr Ser Leu Lys Gly Cys Gln Gly Lys Pro Leu Pro Lys Asp Leu
145                 150                 155                 160

Arg Phe Ile Pro Asp Pro Lys Ala Gly Ile Met Ile Lys Ser Val Lys
                165                 170                 175

Arg Ala Tyr His Arg Leu Cys Leu His Cys Ser Val Asp Gln Glu Gly
            180                 185                 190

Lys Ser Val Leu Ser Glu Lys Phe Ile Leu Lys Val Arg Pro Ala Phe
        195                 200                 205

Lys Ala Val Pro Val Val Ser Val Ser Lys Ala Ser Tyr Leu Leu Arg
    210                 215                 220

Glu Gly Glu Glu Phe Thr Val Thr Cys Thr Ile Lys Asp Val Ser Ser
225                 230                 235                 240

Ser Val Tyr Ser Thr Trp Lys Arg Glu Asn Ser Gln Thr Lys Leu Gln
                245                 250                 255

Glu Lys Tyr Asn Ser Trp His His Gly Asp Phe Asn Tyr Glu Arg Gln
```

```
              260             265             270
Ala Thr Leu Thr Ile Ser Ser Ala Arg Val Asn Asp Ser Gly Val Phe
            275             280             285
Met Cys Tyr Ala Asn Asn Thr Phe Gly Ser Ala Asn Val Thr Thr Thr
            290             295             300
Leu Glu Val Val Asp Lys Gly Phe Ile Asn Ile Phe Pro Met Ile Asn
305             310             315             320
Thr Thr Val Phe Val Asn Asp Gly Glu Asn Val Asp Leu Ile Val Glu
                325             330             335
Tyr Glu Ala Phe Pro Lys Pro Glu His Gln Gln Trp Ile Tyr Met Asn
                340             345             350
Arg Thr Phe Thr Asp Lys Trp Glu Asp Tyr Pro Lys Ser Glu Asn Glu
                355             360             365
Ser Asn Ile Arg Tyr Val Ser Glu Leu His Leu Thr Arg Leu Lys Gly
            370             375             380
Thr Glu Gly Gly Thr Tyr Thr Phe Leu Val Ser Asn Ser Asp Val Asn
385             390             395             400
Ala Ala Ile Ala Phe Asn Val Tyr Val Asn Thr Lys Pro Glu Ile Leu
                405             410             415
Thr Tyr Asp Arg Leu Val Asn Gly Met Leu Gln Cys Val Ala Ala Gly
                420             425             430
Phe Pro Glu Pro Thr Ile Asp Trp Tyr Phe Cys Pro Gly Thr Glu Gln
            435             440             445
Arg Cys Ser Ala Ser Val Leu Pro Val Asp Val Gln Thr Leu Asn Ser
            450             455             460
Ser Gly Pro Pro Phe Gly Lys Leu Val Val Gln Ser Ser Ile Asp Ser
465             470             475             480
Ser Ala Phe Lys His Asn Gly Thr Val Glu Cys Lys Ala Tyr Asn Asp
                485             490             495
Val Gly Lys Thr Ser Ala Tyr Phe Asn Phe Ala Phe Lys Gly Asn Asn
                500             505             510
Lys Glu Gln Ile His Pro His Thr Leu Phe Thr Pro Leu Leu Ile Gly
            515             520             525
Phe Val Ile Val Ala Gly Met Met Cys Ile Ile Val Met Ile Leu Thr
            530             535             540
Tyr Lys Tyr Leu Gln Lys Pro Met Tyr Glu Val Gln Trp Lys Val Val
545             550             555             560
Glu Glu Ile Asn Gly Asn Asn Tyr Val Tyr Ile Asp Pro Thr Gln Leu
                565             570             575
Pro Tyr Asp His Lys Trp Glu Phe Pro Arg Asn Arg Leu Ser Phe Gly
                580             585             590
Lys Thr Leu Gly Ala Gly Ala Phe Gly Lys Val Val Glu Ala Thr Ala
            595             600             605
Tyr Gly Leu Ile Lys Ser Asp Ala Ala Met Thr Val Ala Val Lys Met
            610             615             620
Leu Lys Pro Ser Ala His Leu Thr Glu Arg Glu Ala Leu Met Ser Glu
625             630             635             640
Leu Lys Val Leu Ser Tyr Leu Gly Asn His Met Asn Ile Val Asn Leu
                645             650             655
Leu Gly Ala Cys Thr Ile Gly Gly Pro Thr Leu Val Ile Thr Glu Tyr
                660             665             670
Cys Cys Tyr Gly Asp Leu Leu Asn Phe Leu Arg Arg Lys Arg Asp Ser
                675             680             685
```

```
Phe Ile Cys Ser Lys Gln Glu Asp His Ala Glu Ala Ala Leu Tyr Lys
        690             695             700

Asn Leu Leu His Ser Lys Glu Ser Ser Cys Ser Asp Ser Thr Asn Glu
705             710             715             720

Tyr Met Asp Met Lys Pro Gly Val Ser Tyr Val Val Pro Thr Lys Ala
            725             730             735

Asp Lys Arg Arg Ser Val Arg Ile Gly Ser Tyr Ile Glu Arg Asp Val
            740             745             750

Thr Pro Ala Ile Met Glu Asp Glu Leu Ala Leu Asp Leu Glu Asp
        755             760             765

Leu Leu Ser Phe Ser Tyr Gln Val Ala Lys Gly Met Ala Phe Leu Ala
770             775             780

Ser Lys Asn Cys Ile His Arg Asp Leu Ala Ala Arg Asn Ile Leu Leu
785             790             795             800

Thr His Gly Arg Ile Thr Lys Ile Cys Asp Phe Gly Leu Ala Arg Asp
            805             810             815

Ile Lys Asn Asp Ser Asn Tyr Val Val Lys Gly Asn Ala Arg Leu Pro
            820             825             830

Val Lys Trp Met Ala Pro Glu Ser Ile Phe Asn Cys Val Tyr Thr Phe
        835             840             845

Glu Ser Asp Val Trp Ser Tyr Gly Ile Phe Leu Trp Glu Leu Phe Ser
850             855             860

Leu Gly Ser Ser Pro Tyr Pro Gly Met Pro Val Asp Ser Lys Phe Tyr
865             870             875             880

Lys Met Ile Lys Glu Gly Phe Arg Met Leu Ser Pro Glu His Ala Pro
            885             890             895

Ala Glu Met Tyr Asp Ile Met Lys Thr Cys Trp Asp Ala Asp Pro Leu
            900             905             910

Lys Arg Pro Thr Phe Lys Gln Ile Val Gln Leu Ile Glu Lys Gln Ile
        915             920             925

Ser Glu Ser Thr Asn His Ile Tyr Ser Asn Leu Ala Asn Cys Ser Pro
    930             935             940

Asn Arg Gln Lys Pro Val Val Asp His Ser Val Arg Ile Asn Ser Val
945             950             955             960

Gly Ser Thr Ala Ser Ser Ser Gln Pro Leu Leu Val His Asp Asp Val
            965             970             975
```

ANTIBODY AGAINST c-KIT AND USE THEREOF

CROSS REFERENCE TO RELATED APPLICATIONS

This application is a National Stage of International Application No. PCT/KR2020/016704 filed Nov. 24, 2020, claiming priority based on Korean Patent Application No. 10-2019-0152304 filed Nov. 25, 2019.

SEQUENCE LISTING

The content of the electronically submitted sequence listing, file name: Sequence_Listing_As_Filed.txt; size: 12,352 bytes; and date of creation: May 19, 2022, filed herewith, is incorporated herein by reference in its entirety.

TECHNICAL FIELD

The present disclosure relates to an antibody against c-kit or antigen-binding fragment thereof, nucleic acid encoding the same, a vector including the nucleic acid, a cell transformed with the vector, a method for producing the antibody or antigen-binding fragment, composition for preventing or treating an angiogenic disease containing the same, and a composition for preventing or treating cancer.

BACKGROUND ART

The regulation of angiogenesis and vascular permeability is closely related with hypoxia. In particular, the hypoxic state occurring during embryogenesis or in actively proliferating cancer tissues or damaged vascular tissues is an unstable state wherein the communication between the existing blood vessels and endothelial cells is blocked and permeability is increased. In this situation, new blood vessel is formed as the proliferation and migration of vascular endothelial cells are facilitated. It is known that various genes differentially expressed by transcription factors such as HIF-1 (hypoxia inducible factor-1), etc. are involved in the mechanism whereby the vascular destabilization and angiogenesis are regulated in hypoxic state. Many of these genes increase vascular permeability by decreasing the intercellular junction of vascular endothelial cells or forms new blood vessels by facilitating the growth/migration of vascular endothelial cells as growth factors/cytokines.

Abnormal regulation of angiogenesis and vascular permeability is directly related with not only the organogenesis during embryonic development but also the onset of various diseases in adulthood. Angiogenesis is one of the causes of tumor growth and progress from benign to malignant tumors. In addition, excessive angiogenesis has been reported in various diseases including eye diseases such as age-related macular degeneration, diabetic retinopathy, glaucoma, etc., rheumatoid arthritis, psoriasis, chronic inflammation, etc. (Cameliet and Jain, *Nature*, 407: 249, 2000).

Meanwhile, various factors that facilitate or inhibit angiogenesis have been found, which are involved in the growth, migration, differentiation, etc. of vascular endothelial cells. Inhibitors of angiogenesis can be categorized into matrix breakdown inhibitors, endothelial cell inhibitors, angiogenesis inhibitors, etc. depending on the mechanism of action. Among them, the angiogenesis inhibitors may include drugs that target VEGFR2, VEGFR1, PDGFR, c-KIT, FLT3, etc. and inhibit their activity, signal transduction, production, etc.

In particular, commercially available drugs targeting c-kit include Gleevec (imatinib mesylate) and Sutent (sunitinib malate). However, because they are multi-target therapeutic agents that inhibit several kinases, limitations such as many side effects, low specificity and bioavailability, antigenicity, inappropriate pharmacokinetics, etc. are being reported. Accordingly, development of an effective therapeutic agent for an angiogenesis-related disease caused by activation of c-kit with no side effect is necessary.

Under this technical background, the inventors of this application have made efforts to develop an antibody specifically binding to c-kit. As a result, the inventors have developed an anti-c-kit antibody specifically binding to c-kit and have completed the present disclosure by identifying that it can serve as a therapeutic agent for an angiogenic disease, particularly macular degeneration.

SUMMARY OF INVENTION

The present disclosure is directed to providing a novel antibody against c-kit or antigen-binding fragment thereof.

The present disclosure is also directed to providing a nucleic acid encoding the antibody or antigen-binding fragment thereof.

The present disclosure is also directed to providing a vector including the nucleic acid, a cell transformed with the vector, and a method for preparing the same.

The present disclosure is also directed to providing a composition for preventing or treating an angiogenic disease, which contains the antibody or antigen-binding fragment thereof.

The present disclosure provides an antibody binding to c-kit, which includes a heavy-chain CDR1 including a sequence of SEQ ID NO: 1, a heavy-chain CDR2 including a sequence of SEQ ID NO: 2, a heavy-chain CDR3 including a sequence of SEQ ID NO: 3, a light-chain CDR1 including a sequence of SEQ ID NO: 4, a light-chain CDR2 including a sequence of SEQ ID NO: 5 and a light-chain CDR3 including a sequence of SEQ ID NO: 6, or antigen-binding fragment thereof.

The present disclosure also provides a nucleic acid encoding the antibody or antigen-binding fragment thereof.

The present disclosure also provides a vector including the nucleic acid.

The present disclosure also provides a cell transformed with the vector.

The present disclosure also provides a method for preparing the antibody or antigen-binding fragment thereof, which includes: (a) a step of culturing the cell; and (b) a step of recovering an antibody or antigen-binding fragment thereof from the cultured cell.

The present disclosure also provides a composition for preventing or treating an angiogenic disease and a composition for preventing or treating cancer, which contain the antibody or antigen-binding fragment thereof as an active ingredient.

DETAILED DESCRIPTION AND SPECIFIC EXEMPLARY EMBODIMENTS OF INVENTION

Figure 1:
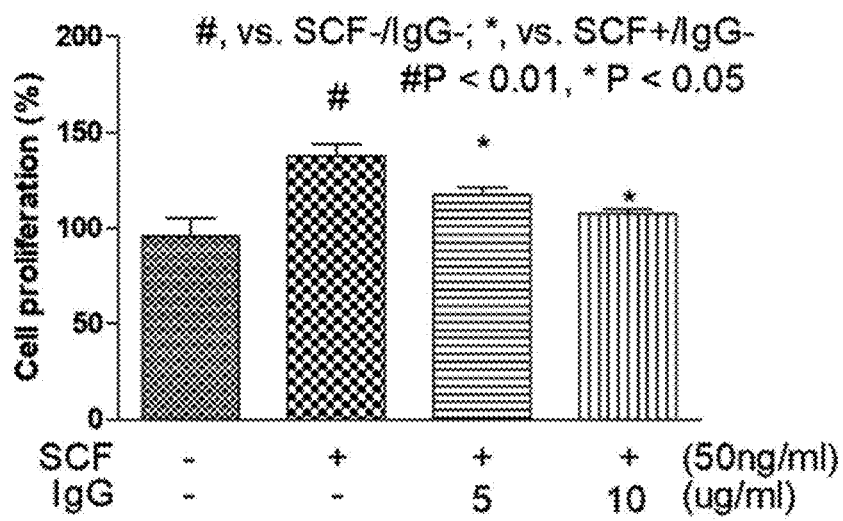
FIG. 1 shows that the proliferation of HUVECs by SCF is inhibited by a c-kit antibody in a concentration-dependent manner.

Unless defined otherwise, all technical and scientific terms used in the present specification have the same meanings as commonly understood by one or ordinary skill in the art to which the present disclosure belongs. Generally, the nomenclature used herein is well known and commonly employed in the art.

In an aspect, the present disclosure relates to an antibody binding to c-kit, which includes a heavy-chain CDR1 including a sequence of SEQ ID NO: 1, a heavy-chain CDR2 including a sequence of SEQ ID NO: 2, a heavy-chain CDR3 including a sequence of SEQ ID NO: 3, a light-chain CDR1 including a sequence of SEQ ID NO: 4, a light-chain CDR2 including a sequence of SEQ ID NO: 5 and a light-chain CDR3 including a sequence of SEQ ID NO: 6, or antigen-binding fragment thereof.

The "c-kit" of the present specification may also be named CD117 or SCFR (stem cell factor receptor). SCF is a glycoprotein which communicates with cells via a cell membrane-associated tyrosine kinase receptor. This signaling pathway serves as a positive and negative regulator in hematopoiesis. The c-kit is expressed on pluripotent hematopoietic stem cells, which are precursors to mature cells belonging to lymphoid and erythroid lineages. Unlike other hematopoietic cells, mast cell precursors and mature mast cells retain high levels of c-kit expression. Hence, SCF signaling via c-kit is vital for the development, function and survival of mast cells. The activation of c-kit mutations in human is associated with mast cell diseases. It has been reported that mast cells can consistently provide a source for angiogenesis, etc.

The term "antibody" used in the present specification refers to an anti-c-kit antibody specifically binding to c-kit, particularly to the domain I of c-kit. Not only the whole antibody specifically binding to c-kit, particularly to the domain I and/or II of c-kit, but also antigen-binding fragment of the antibody molecule is included in the scope of the present disclosure.

The whole antibody has two full-length light chains and two full-length heavy chains, wherein each light chain is linked to the corresponding heavy chain by a disulfide bond. The heavy-chain constant region has gamma (γ), mu (μ), alpha (α), delta (δ) and epsilon (ε) types and is subclassified into gamma 1 (γ1), gamma 2 (γ2), gamma 3 (γ3), gamma 4 (γ4), alpha 1 (α1) and alpha 2 (α2). The light-chain constant region has kappa (κ) and lambda (λ) types.

An antigen-binding fragment of an antibody or an antibody fragment refers to a fragment that has antigen-binding function, and includes Fab, F(ab'), F(ab')$_2$, Fv, etc. Among the antibody fragments, Fab includes a variable region of each of the light chain and the heavy chain, a constant region of the light chain and the first constant region ($C_{H1}$) of the heavy chain, and has one antigen-binding site. Fab' is different from Fab in that it further includes a hinge region having at least one cysteine residue at the C-terminus of the $C_{H1}$ domain of the heavy chain. The F(ab')$_2$ antibody is formed by a disulfide bond between the cysteine residues in the hinge region of Fab'. Fv is the minimal antibody fragment having only a heavy-chain variable region and a light-chain variable region. Two-chain Fv has a structure in which a light-chain variable region is linked to a heavy-chain variable region via a non-covalent bond, and single-chain Fv has a structure in which a heavy-chain variable region and a light-chain variable region are linked by a covalent bond via a peptide linker or they are directly linked at the C-terminal to form a dimer-like structure, like the two-chain Fv. The antibody fragment may be obtained using a protease (e.g., Fab can be obtained by restriction-cleaving the whole antibody with papain, and the F(ab')$_2$ fragment can be obtained by restriction-cleaving the whole antibody with pepsin), and may be prepared by genetic recombination techniques.

In an exemplary embodiment, the antibody according to the present disclosure may be in the form of Fv (e.g., scFv) or a whole antibody. In addition, the heavy-chain constant region may be one selected from the isotypes gamma (γ), mu (μ), alpha (α), delta (δ), epsilon (ε), etc. For example, the constant region may be gamma1 (IgG1), gamma 3 (IgG3) or gamma 4 (IgG4). The light-chain constant region may be kappa or lambda type.

The term "heavy chain" used in the present specification encompasses both a full-length heavy chain, which includes a variable region domain ($V_H$) containing an amino acid sequence having a variable region sequence sufficient for imparting specificity to an antigen and three constant domains $C_{H1}$, $C_{H2}$ and $C_{H3}$, and a fragment thereof. Also, the term "light chain" used in the present specification encompasses both a full-length light chain, which includes a variable region domain ($V_L$) containing an amino acid sequence having a variable region sequence sufficient for imparting specificity to an antigen and a constant region $C_L$, and a fragment thereof.

The antibody of the present disclosure includes a monoclonal antibody, a multispecific antibody, a human antibody, a humanized antibody, a chimeric antibody, a single-chain Fv (scFV), a single-chain antibody, an Fab fragment, an F(ab') fragment, a disulfide-linked Fv (dsFV), an anti-idiotypic (anti-Id) antibody, an epitope-binding fragment of the above-described antibody, etc., although not being limited thereto.

The monoclonal antibody refers to the same antibody obtained from a population of substantially homogeneous antibodies, excluding possible naturally occurring mutations that may be present in a minor amount. Monoclonal antibodies are highly specific and are induced against a single antigenic site. Unlike conventional (polyclonal) antibody preparations that typically include different antibodies directed against different determinants (epitopes), each monoclonal antibody is directed against a single determinant on the antigen.

The "epitope" refers to a protein determinant to which an antibody can bind specifically. An epitope usually consists of a group of chemically active surface molecules, such as amino acid or sugar side chains, and generally have not only specific three-dimensional structural characteristics but also specific charge characteristics. Three-dimensional epitopes are distinguished from non-three-dimensional epitopes in that the bond to the former is broken in the presence of a denatured solvent, while the bond to the latter is not broken.

The antibody according to the present disclosure binds to the domain I and/or domain II of c-kit. For example, it has been confirmed to bind to c-kit of SEQ ID NO: 11, from R49 of domain I to C186 of domain II.

A "humanized" form of a non-human (e.g., murine) antibody is a chimeric antibody containing a minimal sequence derived from non-human immunoglobulin. In most cases, the humanized antibody is a human immunoglobulin (receptor antibody) in which a residue from the hypervariable region of a receptor is replaced with a residue from the hypervariable region of a non-human species (donor antibody), e.g., mouse, rat, rabbit or a non-human primate, having the desired specificity, affinity and ability.

The "human antibody" refers to a molecule derived from a human immunoglobulin, in which all of the amino acid sequences constituting the antibody including a complementarity-determining region and a structural region are composed of human immunoglobulins.

The human antibody includes not only a "chimeric" antibody (immunoglobulin) in which the heavy-chain and/or light-chain portions are derived from a certain species, or are identical or homologous to the corresponding sequences in an antibody belonging to a certain antibody class or subclass, but the remaining chain(s) are derived from another species or are identical or homologous to the corresponding sequences in an antibody belonging to another antibody class or subclass, but also a fragment of the antibody that exhibits the desired biological activity.

As used herein, the term "antibody variable domain" refers to light-chain and heavy-chain regions of an antibody molecule including the amino acid sequence of a complementarity-determining region (CDR; i.e., CDR1, CDR2 and CDR3) and a framework region (FR). $V_H$ refers to a variable domain of the heavy chain. $V_L$ refers to a variable domain of the light chain.

The term "complementarity-determining region" (CDR; i.e., CDR1, CDR2 and CDR3) refers to an amino acid residue of the antibody variable domain that is necessary for antigen binding. Each variable domain typically has three CDR regions, identified as CDR1, CDR2 and CDR3.

In the present disclosure, the antibody binding to c-kit or antigen-binding fragment thereof includes a heavy-chain CDR1 including a sequence of SEQ ID NO: 1, a heavy-chain CDR2 including a sequence of SEQ ID NO: 2, a heavy-chain CDR3 including a sequence of SEQ ID NO: 3, a light-chain CDR1 including a sequence of SEQ ID NO: 4, a light-chain CDR2 including a sequence of SEQ ID NO: 5, and a light-chain CDR3 including a sequence of SEQ ID NO: 6.

The "framework region" (FR) refers to a variable domain residue other than the CDR residue. Each variable domain typically has four FRs, identified as FR1, FR2, FR3 and FR4.

The "Fv" fragment is an antibody fragment containing the complete antibody recognition and binding sites. Such a region includes a dimer, e.g., scFv that consists of one heavy-chain variable domain and one light-chain variable domain substantially tightly covalently linked to each other.

The "Fab" fragment contains a variable domain and a constant domain of the light chain and a variable domain and a first constant domain ($C_{H1}$) of the heavy chain. The $F(ab')_2$ antibody fragment generally includes a pair of Fab fragments covalently linked via a hinge cysteine located therebetween near the carboxyl end thereof.

The "single-chain Fv" or "scFv" antibody fragment includes $V_H$ and $V_L$ domains of the antibody, wherein these domains are present in a single polypeptide chain. The Fv polypeptide may further include a polypeptide linker between the $V_H$ domain and the $V_L$ domain in order for the scFv to form a desired structure for antigen binding.

The c-kit antibody may be monovalent or divalent and may include single or double chains. Functionally, the binding affinity of the c-kit antibody to c-kit, particularly to the domain 1 and/or domain 2 c-kit, ranges from $10^{-5}$ M to $10^{-12}$ M. For example, the binding affinity of the c-kit antibody is $10^{-6}$ M to $10^{-12}$ M, $10^{-7}$ M to $10^{-12}$ M, $10^{-8}$ M to $10^{-12}$ M, $10^{-9}$ M to $10^{-12}$ M, $10^{-5}$ M to $10^{-11}$ M, $10^{-6}$ M to $10^{-11}$ M, $10^{-7}$ M to $10^{-11}$ M, $10^{-8}$ M to $10^{-11}$ M, $10^{-9}$ M to $10^{-11}$ M, $10^{-10}$ M to $10^{-11}$ M, $10^{-5}$ M to $10^{-10}$ M, $10^{-6}$ M to $10^{-10}$ M, $10^{-7}$ M to $10^{-10}$ M, $10^{-5}$ M to $10^{-10}$ M, $10^{-9}$ M to $10^{-10}$ M, $10^{-5}$ M to $10^{-9}$ M, $10^{-6}$ M to $10^{-9}$ M, $10^{-7}$ M to $10^{-9}$ M, $10^{-8}$ M to $10^{-9}$ M, $10^{-5}$ M to $10^{-8}$ M, $10^{-6}$ M to $10^{-8}$ M, $10^{-7}$ M to $10^{-8}$ M, $10^{-5}$ M to $10^{-7}$ M, $10^{-6}$ M to $10^{-7}$ M or $10^{-5}$ M to $10^{-6}$ M.

The antibody binding to c-kit or antigen-binding fragment thereof may include a heavy-chain variable region including a sequence having a sequence homology of 90% or higher to a sequence of SEQ ID NO: 7. In addition, the antibody binding to c-kit or antigen-binding fragment thereof may include a light-chain variable region including a sequence having a sequence homology of 90% or higher to a sequence of SEQ ID NO: 8.

The antibody or antibody fragment of the present disclosure may include not only the sequence of the anti-c-kit antibody mentioned herein but also biological equivalents thereto, as long as c-kit can be specifically recognized. For example, additional variations can be made to the amino acid sequence of the antibody in order to further improve the binding affinity and/or other biological properties of the antibody. Such variations include, for example, deletion, insertion and/or substitution of the amino acid sequence residues of the antibody. Such amino acid variations are based on the relative similarity of amino acid side chain substituents, such as the hydrophobicity, hydrophilicity, charge and size. It can be seen, based on analysis of the size, shape and type of amino acid side chain substituents, that all of arginine, lysine and histidine are positively charged residues; alanine, glycine and serine have similar sizes; and phenylalanine, tryptophan and tyrosine have similar shapes. Thus, based on these considerations, arginine, lysine and histidine; alanine, glycine and serine; and phenylalanine, tryptophan and tyrosine are considered to be biologically functional equivalents.

When taking into consideration the variations having biologically equivalent activity, the antibody or a nucleotide molecule encoding the same according to the present disclosure is interpreted to include a sequence having substantial identity with the sequences set forth in the sequence numbers. The substantial identity means that a sequence has a homology of at least 90%, most preferably a homology of at least 95%, at least 96%, at least 97%, at least 98% or at least 99%, when the sequence of the present disclosure is aligned so as to correspond to any other sequence as much as possible and the aligned sequence is analyzed using algorithms commonly used in the art. Alignment methods for sequence comparison are well-known in the art. The NCBI Basic Local Alignment Search Tool (BLAST) is accessible through NCBI or the like, and can be used in conjunction with sequence analysis programs such as BLASTP, BLASTM, BLASTX, TBLASTN and TBLASTX over the Internet. BLAST is available at www.ncbi.nlm.nih.gov/BLAST/. A method for comparing sequence homology using this program can be found at www.ncbi.nlm.nih.gov/BLAST/blast_help.html.

Based on this, the antibody or antigen-binding fragment thereof according to the present disclosure can have a homology of 90%, 91%, 92%, 93%, 94%, 95%, 96%, 97%, 98%, or 99% or higher compared to the sequence disclosed herein. Such homology can be determined through sequence comparison and/or alignment by methods known in the art. For example, the percentage sequence homology of the nucleic acid or protein according to the present disclosure can be determined using a sequence comparison algorithm (i.e., BLAST or BLAST 2.0) or by manual alignment or visual inspection.

In another aspect, the present disclosure relates to a nucleic acid encoding the antibody or antigen-binding fragment thereof.

By isolating a nucleic acid encoding the antibody or antigen-binding fragment thereof according to the present disclosure, the antibody or antigen-binding fragment thereof can be produced in a recombinant manner. The nucleic acid is isolated and inserted into a replicable vector, followed by further cloning (amplification of DNA) or further expression. Based on this, in another aspect, the present disclosure relates to a vector including the nucleic acid.

The "nucleic add" is intended to encompass both DNA (gDNA and cDNA) and RNA molecules, and a nucleotide, which is a basic constituent unit of a nucleic acid, includes not only naturally derived nucleotides but also analogues thereof, wherein sugar or base moieties are modified. The sequence of the nucleic acid encoding heavy- and light-chain variable regions of the present disclosure can be varied. Such variation includes addition, deletion, or non-conservative or conservative substitution of nucleotides.

The DNA encoding the antibody can be easily separated or synthesized using conventional procedures (e.g., using an oligonucleotide probe capable of specifically binding to the DNA encoding heavy and light chains of the antibody). A variety of vectors are obtainable. Vector components generally include, but are not limited to, one or more of the following components: signal sequences, replication origins, one or more marker genes, enhancer elements, promoters, and transcription termination sequences.

The term "vector" used in the present specification refers to a means for expressing a target gene in a host cell, and includes plasmid vectors, cosmid vectors and viral vectors such as bacteriophage vectors, adenovirus vectors, retroviral vectors and adeno-associated viral vectors. The nucleic acid encoding the antibody is operably linked to a promoter in the vector.

The term "operably linked" means a functional linkage between a nucleic acid expression regulation sequence (e.g., array of the binding site of promoter, signal sequence or transcription regulator) and another nucleic acid sequence, and enables the regulation sequence to regulate the transcription and/or translation of the other nucleic acid sequence.

When a prokaryotic cell is used as a host, it generally includes a potent promoter capable of conducting transcription (e.g., tac promoter, lac promoter, lacUV5 promoter, lpp promoter, pLA promoter, pRA promoter, rac5 promoter, amp promoter, recA promoter, SP6 promoter, trp promoter, T7 promoter, etc.), a ribosome-binding site for initiation of translation and a transcription/translation termination sequence. In addition, for example, when a eukaryotic cell is used as a host, it includes a promoter derived from the genome of a mammalian cell (e.g., metallothionein promoter, β-actin promoter, human hemoglobin promoter or human muscle creatine promoter), or a promoter derived from a mammalian virus (e.g., adenovirus late promoter, vaccinia virus 7.5K promoter, SV40 promoter, cytomegalovirus (CMV) promoter, HSV tk promoter, mouse mammary tumor virus (MMTV) promoter, HIV LTR promoter, Moloney virus promoter, Epstein-Barr virus (EBV) promoter and Rous sarcoma virus (RSV) promoter), and generally has a polyadenylation sequence as a transcription termination sequence.

Optionally, the vector may be fused with another sequence in order to facilitate purification of the antibody expressed therefrom. The sequence to be fused includes, for example, glutathione S-transferase (Pharmacia, USA), maltose-binding protein (NEB, USA), FLAG (IBI, USA), 6×His (hexahistidine; Qiagen, USA), etc.

The vector includes an antibiotic-resistant gene commonly used in the art as a selectable marker, and examples thereof include genes conferring resistance to ampicillin, gentamycin, carbenicillin, chloramphenicol, streptomycin, kanamycin, geneticin, neomycin and tetracycline.

In another aspect, the present disclosure relates to a cell transformed with the above-mentioned vector. The cell used to produce the antibody of the present disclosure may be a prokaryotic, yeast or higher eukaryotic cell, but is not limited thereto.

Prokaryotic host cells such as *Escherichia coli*, bacteria in the genus *Bacillus*, such as *Bacillus subtilis* and *Bacillus thuringiensis, Streptomyces* spp., *Pseudomonas* spp. (e.g., *Pseudomonas putida*), *Proteus mirabilis* and *Staphylococcus* spp. (e.g., *Staphylococcus carnosus*) may be used.

Interest in animal cells is the greatest, and examples of useful host cells include COS-7, BHK, CHO, CHOK1, DXB-11, DG-44, CHO/-DHFR, CV1, COS-7, HEK293, BHK, TM4, VERO, HFLA, MACK, BRL 3A, W138, Hep G2, SK-Hep, MMT, TRI, MRC 5, FS4, 3T3, RIN, A549, PC12, K562, PER.C6, SP2/0, NS-0, U20S or HT1080, although not being limited thereto.

In another aspect, the present disclosure relates to a method for preparing the antibody or antigen-binding fragment thereof, which includes: (a) a step of culturing the cell; and (b) a step of recovering an antibody or antigen-binding fragment thereof from the cultured cell.

The cells can be cultured in various media. Any commercially available medium can be used as a culture medium without limitation. All essential supplements well known to those skilled in the art may be included in appropriate concentrations. Culture conditions such as temperature and pH are conventionally used with host cells selected for expression, as will be apparent to those skilled in the art.

The recovery of the antibody or antigen-binding fragment thereof can be carried out, for example, by centrifugation or ultrafiltration to remove impurities, and the resulting product may be purified, for example, by affinity chromatography, etc. Other additional purification techniques such as anion or cation exchange chromatography, hydrophobic interaction chromatography and hydroxyapatite chromatography, etc. may be used.

In another aspect, the present disclosure relates to a composition for preventing or treating an angiogenic disease, which contains the antibody as an active ingredient.

The composition of the present disclosure may be, for example, a pharmaceutical composition for preventing or treating an angiogenic disease, which contains (a) a pharmaceutically effective amount of the antibody against c-kit or antigen-binding fragment thereof according to the present disclosure; and (b) a pharmaceutically acceptable carrier. The present disclosure also relates to a method for preventing or treating an angiogenic disease, which includes a step of administering an effective amount of the antibody against c-kit or antigen-binding fragment thereof according to the present disclosure to a patient in need thereof.

The angiogenic disease refers to a disease related with the onset or progress of angiogenesis. Any disease that can be treated with the antibody may be encompassed in the scope of the angiogenesis-related disease. The angiogenic disease includes diabetic retinopathy, retinopathy of prematurity, corneal graft rejection, macular degeneration, neovascular glaucoma, erythrosis, proliferative retinopathy, psoriasis, hemophilic arthritis, capillary formation of atherosclerotic plaques, keloid, wound granulation, vascular adhesion, rheumatoid arthritis, degenerative arthritis (osteoarthritis), autoimmune disease, Crohn's disease, restenosis, atherosclerosis, intestinal adhesion; cat-scratch disease, ulcer, liver cirrhosis; nephritis; diabetic nephropathy, diabetes mellitus, inflammatory disease and neurodegenerative disease; although not being limited thereto.

In another aspect, the present disclosure relates to a composition for preventing or treating cancer, which contains the antibody as an active ingredient.

The composition of the present disclosure may be, for example, pharmaceutical composition for preventing or treating cancer; which contains (a) a pharmaceutically effective amount of the antibody against c-kit or antigen-binding fragment thereof according to the present disclosure; and (b) a pharmaceutically acceptable carrier. The present disclosure also relates to a method for preventing or treating cancer, which includes a step of administering an effective amount of the antibody against c-kit or antigen-binding fragment thereof according to the present disclosure to a patient in need thereof.

The cancer is selected from a group consisting of esophageal cancer, stomach cancer, large intestine cancer, rectal cancer, oral cancer, pharyngeal cancer, laryngeal cancer, lung cancer, colon cancer, breast cancer, cervical cancer, endometrial cancer, ovarian cancer, prostate cancer, testicular cancer, bladder cancer, renal cancer, liver cancer, pancreatic cancer, bone cancer, connective tissue cancer; skin cancer, brain cancer, thyroid cancer, leukemia, Hodgkin's lymphoma, lymphoma and multiple myeloid blood cancer; although not being limited thereto. In some cases; the caner may include metastatic cancer.

According to the present disclosure; Gleevec-resistant cancer caused by the amplification of the c-kit gene, the overexpression of the c-kit protein or the mutation of c-kit can be treated. The Gleevec-resistant cancer may be, for example, leukemia, GIST (gastrointestinal stromal tumor), melanoma, SOLO (small-cell lung cancer), NSCLC (non-small-cell lung cancer, glioma, GBM (glioblastoma multiforme), colorectal cancer or mastocytosis.

In some cases, the composition may be used for preventing or treating fibrosis. There have been many reports that c-kit-positive mast cells can induce fibrosis.

The composition uses the anti-c-kit antibody or antigen-binding fragment thereof of the present disclosure described above as an active ingredient. Thus, further description will be omitted to avoid redundancy.

The "prevention" refers to any action of inhibiting or delaying the progress of an angiogenic disease by administering the composition according to the present disclosure, and the "treatment" refers to any action of inhibiting the progress of an angiogenic disease or alleviating or curing an angiogenic disease.

The pharmaceutically acceptable carrier contained in the composition of the present disclosure is one commonly used in preparation, and includes lactose, dextrose, sucrose, sorbitol, mannitol, starch, acacia gum, calcium phosphate, alginate, gelatin, calcium silicate, microcrystalline cellulose, polyvinylpyrrolidone, water, syrup, methyl cellulose, methyl hydroxybenzoate, propyl hydroxybenzoate, talc, magnesium stearate, mineral oil, etc., although not being limited thereto. The composition of the present disclosure may further contain, in addition to the above ingredients, a lubricant, a wetting agent, a sweetener, a flavorant, an emulsifier, a suspending agent, a preservative, etc.

The pharmaceutical composition of the present disclosure may be administered orally or parenterally. For parenteral administration, it may be administered intravenously, subcutaneously, intramuscularly, intraperitoneally, intradermally, topically, intranasally, intrapulmonarily, intrarectally, etc.

For oral administration, the composition should be formulated by coating the active ingredient because a protein or a peptide is digested in the stomach. In addition, the pharmaceutical composition may be administered by any device capable of delivering the active ingredient to a target cell.

The adequate administration dosage of the composition according to the present disclosure varies depending on such factors as formulation method, mode of administration, the age, sex, body weight, pathological condition and diet of a patient, administration time, administration route, excretion rate and response sensitivity, and an ordinarily skilled physician can easily determine and prescribe an administration dosage effective for the desired treatment or prevention. For example, a daily administration dosage of the pharmaceutical composition of the present disclosure is 0.0001-100 mg/kg. In the present specification, the term "pharmaceutically effective amount" refers to an amount sufficient for preventing or treating cancer.

The pharmaceutical composition of the present disclosure may be formulated using a pharmaceutically acceptable carrier and/or excipient into a single-dose or multi-dose form according to a method that can be easily carried out by those having ordinary knowledge in the art to which the present disclosure belongs. The formulation may be in the form of a solution, suspension or emulsion in an oily or aqueous medium, an extract, a powder, a suppository, a powder, a granule, a tablet or a capsule, and may further contain a dispersant or a stabilizer.

The present disclosure also relates to a composition for co-administration, which contains the antibody or antigen-binding fragment thereof.

The composition of the present disclosure may enhance immune response targeted for tumor cells by increasing anti-tumor T cell activity. It may be used in combination with other anti-neoplastic or immunogenic agents [e.g., attenuated cancer cells, tumor antigens (including recombinant proteins, peptides and carbohydrate molecules), antigen transfer cells, for example, tumor-derived antigens or nucleic acid-pulsed dendritic cells, immunostimulating cytokines (e.g., IL-2, IFNα2, and GM-CSF), and cells transfected with genes encoding immunostimulating cytokines (including, for example, but not limited to GM-CSF)]; standard cancer therapy (e.g. chemotherapy, radiotherapy or surgery); or other antibodies (including but not limited to VEGF, EGFR, Her2/neu, VEGF receptors, other growth factor receptors, CD20, CD40, CTLA-4, OX-40, 4-IBB, and ICOS).

The composition of the present disclosure may be administered as an individual therapeutic agent or may be co-administered with another therapeutic agent. It may be administered sequentially or simultaneously with the existing therapeutic agent. The administration dosage, administration method and co-administered drug may be prescribed adequately depending on the patient's condition.

In another aspect, the present disclosure relates to a multispecific antibody including the antibody or antigen-binding fragment thereof. The multispecific antibody includes a tetraspecific antibody, a trispecific antibody or a bispecific antibody. For example, a bispecific antibody refers to an antibody capable of binding two different antigens (target proteins), and is prepared by genetic engineering or other techniques.

The multispecific antibody refers to an antibody having binding specificity for at least two different antigens, and the multispecific antibodies may be classified into scFv-based antibodies, Fab-based antibodies, IgG-based antibodies, etc. Since the bispecific antibody can inhibit or enhance two signals at the same time, it can be more effective than an antibody that inhibits/enhances one signal. It can be administered at a lower dosage and can inhibit/enhance two signals in the same time and space domains.

Methods for preparing a bispecific antibody are widely known. Traditionally, recombinant production of a bispecific antibody is based on co-expression of two immunoglobulin heavy-chain/light-chain pairs, where the two heavy chains have different specificities.

In the case of the scFv-based bispecific antibody, a diabody having a hybrid scFv in a heterodimeric form may be prepared by combining $V_L$ and $V_H$ of different scFvs. And, tandem ScFv may be prepared by linking different scFvs to each other. A heterodimeric miniantibody may be prepared by expressing $C_{H1}$ and $C_L$ of Fab from the termini of scFv, respectively. And, a minibody in a heterodimeric scFv form may be prepared by substituting some amino acids of the $C_{H3}$ domain, which is a homodimeric domain of Fc, to change the heterodimeric structure in a 'knob into hole' form and expressing these modified $C_{H3}$ domains from the termini of scFv, respectively.

The Fab-based bispecific antibody may be prepared into the form of heterodimeric Fab by combining separate Fab's against specific antigens with each other using a disulfide bond or a mediator. Also, a bivalent antibody may be prepared by expressing ScFvs against different antigens from the termini of a heavy chain or a light chain of specific Fab, and a tetravalent antibody may be prepared in a homodimeric form by interposing a hinge region between Fab and ScFv. In addition, a trivalent dual-targeting bibody may be prepared by fusing ScFvs against different antigens to the termini of the light chain and heavy chain of Fab, and a triple-targeting bibody may be prepared by fusing different ScFvs respectively to the termini of the light chain and heavy chain of Fab.

In the case of the IgG-based bispecific antibody, a method of producing a bispecific antibody by hybridizing mouse and rat hybridomas to prepare a hybrid hybridoma, also called a quadroma, was developed by Trion Pharma. Meanwhile, a bispecific antibody in the form of "Holes and Knob" may be prepared in a heterodimeric form by modifying some amino acids of the $C_{H3}$ homodimeric domain of Fc for different heavy chains while sharing the light chain domain. In addition to the bispecific antibody in a heterodimeric form, (ScFv)$_4$-IgG in a homodimeric form may be prepared by fusing two different ScFvs to the constant domains of the light chain and the heavy chain of IgG instead of the variable domains thereof. Also, Imclone produced a bispecific antibody by fusing only a single variable domain for mouse platelet-derived growth factor receptor-α to the N-terminus of the light chain of a chimeric monoclonal antibody IMC-1C11 against human VEGFR-2. In addition, an antibody having multiple antigen valencies for CD20 can be prepared by the "dock and lock (DNL)" method using a dimerization and docking domain (DDD) of an R subunit of protein kinase A (PKA) and an anchoring domain of the PKA.

In another aspect, the present disclosure relates to an antibody-drug conjugate including the antibody or antigen-binding fragment thereof and a drug.

With regard to the antibody-drug conjugate, an anticancer drug should be bound stably to the antibody until the anticancer drug is delivered to a target cancer cell. The drug delivered to the target cell should be released from the antibody and induce the death of the target cell. For this purpose, the drug should be stably bound to the antibody and, at the same time, should exhibit sufficient cytotoxicity to induce the death of the target cell when released in the target cell.

The drug is an agent exhibiting pharmacological effect. It may be bound to the antibody of the present disclosure or a fragment thereof. It may be released from the antibody or a fragment thereof under an acidic condition and exhibits therapeutic effect on a target cell. The drug may be a cytotoxin, a radioisotope, an anti-proliferative agent, a pro-apoptotic agent, a chemotherapeutic agent or a therapeutic nucleic acid, although not being specially limited thereto.

The antibody-drug conjugate may be internalized into a cell and may mediate antibody-dependent cytotoxicity.

The term "cytotoxic activity" refers to a cell-killing, cell proliferation-inhibiting or cell growth-inhibiting effect of the antibody-drug conjugate or an intracellular metabolite of the antibody-drug conjugate. The cytotoxic activity may be expressed as the IC$_{50}$ value which is the concentration (molar or mass) per unit volume at which half of cells survive.

The term cytotoxin generally refers to an agent which inhibits or prevents the function of a cell and/or destroys the cell. Typical cytotoxins include antibiotics, tubulin polymerization inhibitors, alkylating agents that bind to and destroy DNAs, and agents that disrupt the essential functions of cellular proteins, such as protein kinases, phosphatases, topoisomerases, enzymes and cyclins, or protein synthesis. Examples of the cytotoxin include Taxol, cytochalasin B, gramicidin D, ethidium bromide, emetine, mitomycin, etoposide, teniposide, vincristine, vinblastine, colchicine, doxorubicin, daunorubicin, dihydroxyanthracenedione, mitoxantrone, mithramycin, actinomycin D, 1-dehydrotestosterone, glucocorticoids, procaine, tetracaine, lidocaine, propranolol, puromycin and analogues or homologues thereof, although not being limited thereto.

For application to radiation therapy, the antibody of the present disclosure may contain a high-energy radioisotope. The isotope can be bound directly to the antibody, for example, at a cysteine residue present in the antibody, or a chelator may be used to mediate the binding of the antibody and the radioisotope. Radioisotopes suitable for radiation therapy include α-emitters, β-emitters and Auger electrons, although not being limited thereto. Radioisotopes useful for diagnostic applications include positron emitters and γ-emitters.

The anti-proliferative agents and the pro-apoptotic agents include activators of PPAR-gamma (e.g., cyclopentenone prostaglandins (cyPGs)), retinoids, triterpinoids (e.g., cycloartane, lupane, ursane, oleanane, friedelane, dammarane, cucurbitacin, and limonoid triterpenoids), inhibitors of EGF receptor (e.g., HER4), rampamycin, calcitriol (1,25-dihydroxycholecalciferol (vitamin D)), aromatase inhibitors (Femara (letrozone)), telomerase inhibitors, iron chelators (e.g., 3-aminopyridine-2-carboxaldehyde thiosemicarbazone (Triapine)), apoptin (viral protein 3 (VP3) from chicken anemia virus), inhibitors of Bcl-2 and Bcl-X(L), TNF-alpha, FAS ligand, TNF-related apoptosis-inducing ligand (TRAIL/Apo2L), activators of TNF-alpha/FAS ligand/TNF-related apoptosis-inducing ligand (TRAIL/Apo2L) signaling, and inhibitors of PI3K-Akt survival pathway signaling (e.g., UCN-01 and geldanamycin).

The "chemotherapeutic agent" is a chemical compound useful for treatment of cancer, regardless of the mechanism of action mechanism. The chemotherapeutic agents include alkylating agents, metabolic antagonists, spindle toxins, plant alkaloids, cytotoxic/antitumor antibiotics, topoisomerase inhibitors, antibodies, photosensitizers and kinase inhibitors, although not being limited thereto. The chemotherapeutic agents include the compounds used for "targeted therapies" and traditional chemotherapies.

The conjugate may be prepared by a known method by combining a drug with an antibody or a functional equivalent thereof. The antibody and the drug may be bound directly through their own linking groups or indirectly through linkers or other materials. The main mechanisms by which the drug is cleaved from the antibody include hydrolysis of lysosomes (hydrazones, acetals and cis-aconate-like amides) at acidic pH, peptide cleavage by lysosomal enzymes (cathepsin and other lysosomal enzymes) and reduction of disulfide linkages. As a result of these various cleavage mechanisms, the mechanisms by which drug is linked to the antibody can be diverse, and any suitable linker can be used.

Suitable linking groups for binding the antibody and the drug are well known in the art, and examples thereof include disulfide groups, thioether groups, acid-degradable groups, photodegradable groups, peptidase-degradable groups, and esterase-degradable groups.

When the drug is bonded directly, the linking group may be, for example, a disulfide bond using an SH group or a bond through maleimide. For example, the intramolecular disulfide bond of the antibody Fc region and the disulfide bond of a drug are reduced, and both are linked by a disulfide bond. There are also a method using maleimide and a method of genetically introducing cysteine into an antibody.

The antibody and the drug may be bound indirectly through other substances (linkers). Such a linker preferably has one or more types of functional groups that react with the antibody, the drug or both. Examples of the functional groups include amino groups, carboxyl groups, mercapto groups, maleimide groups, pyridinyl groups, and the like.

EXAMPLES

Hereinafter, the present disclosure will be described in more detail with reference to examples. The examples are only for illustration of the present disclosure and it will be obvious to those having ordinary knowledge in the art that the scope of the present disclosure is not limited by the examples.

Example 1. Preparation of c-Kit Antibody

1. Antigen Immunization

An emulsion was prepared by mixing 50 μg/mouse of recombinant c-kit protein (Cat #PKSH030939) purchased from Elabscience with a complete Freund's adjuvant (Sigma, USA) of the same volume. The emulsion was intraperitoneally administered to six humanized NSG obtained by injecting human CD34+ cells to 7-week-old female mice. 50 μg of an antigen was injected to each mouse at a total volume of 500 μL. 1 and 2 weeks later, an emulsion obtained by mixing an incomplete Freund's adjuvant (Sigma, USA) with an antigen was intraperitoneally administered to the mice. After identifying the formation of an antibody by conducting enzyme-linked immunosorbent assay, an emulsion obtained by mixing an incomplete Freund's adjuvant (Sigma, USA) with an antigen was intraperitoneally administered to the mice once again 3 days prior to cell fusion.

2. Identification and Screening of Antibody-Producing Cells

After taking blood from the eye of the mouse humanized according to the above-described method and transferring to a 1.5-mL microcentrifuge tube, centrifuge was performed at 13,000 rpm for 10 minutes. After separation, the serum was stored at −20° C. until the experiment for identifying antibody production. After identifying antibody production through enzyme-linked immunosorbent assay using an antigen protein, the fusion of antibody-producing mouse splenocytes was conducted.

3. Preparation of Hybridoma

After identifying the antibody production, the mouse was sacrificed and splenocytes isolated therefrom were fused with P3X63Ag8.653 myeloma cells (ATCC CRL-1580). The mouse P3X63Ag8.653 cells were cultured on a culture plate using an RPMI 1640 medium supplemented with 10% fetal bovine serum. For cell fusion, the P3X63Ag8.653 cells were washed twice with a serum-free RPMI 1640 medium (Hyclone, USA) and was adjusted to a concentration of $1 \times 10^7$ cells. After sacrificing the mouse by cervical dislocation and extracting the spleen, splenocytes were isolated in a mesh container (Sigma, USA). After preparing a suspension of the splenocytes, the suspension was centrifuged. The splenocyte solution was exposed to Tris-$NH_4Cl$ (Tris 20.6 g/L, $NH_4Cl$ 8.3 g/L) to lyse red blood cells. After centrifuging 400 g of the completely isolated antibody-producing cells for 5 minutes, they were washed twice with a serum-free medium and then resuspended in 10 mL of a medium. After counting lymphocytes using a hemocytometer, $1 \times 10^8$ lymphocytes were mixed with $1 \times 10^7$ P3X63Ag 8.653 cells (10:1) in a serum-free medium. Then, centrifugation was conducted at 400×g for 5 minutes.

After mixing with 1 mL of a 50% (M/V) polyethylene glycol 1500 (Sigma, USA) solution heated at 37° C. by dropping for 1 minute, the prepared fusion mixture solution was diluted with serum-free RPMI 1640 and then centrifuged at 400 g for 3 minutes. Then, the cells were suspended in 35 mL of an RPMI 1640 selective medium supplemented with 20% fetal bovine serum and HAT (100 μM hypoxanthine, 0.4 μM aminopterin, 16 μM thymidine).

100 μL of the suspension was loaded onto a 96-well plate coated with feeder cells (macrophages isolated from the peritoneal cavity using RPMI1640) one day before, and cultured at 37° C. under the condition of 5% $CO_2$. After 5 days, the cells were cultured for 14 days while changing the HAT medium with 2- to 3-day intervals. After 14 days, secondary culture was performed by replacing the medium with an RPMI1640 medium supplemented with 20% fetal bovine serum and HT (a medium in which 0.4 μM aminopterin was removed from HAT).

4. Selection and Isolation of Antibody-Producing Fused Cells

A supernatant of the culture of the fused cells prepared above was collected and subjected to enzyme-linked immunosorbent assay to determine whether an antibody specific for the antigen was produced. A culture exhibiting an appropriate concentration corresponding to 4 times or higher of a negative control group was selected and transferred to a 24-well plate for culturing. In addition, after culturing by dilution to one cell per ell in a 96-well plate (limiting dilution), the culture was recovered, and the c-kit protein, which was used as the antigen, was coated on the 96-well plate at 0.1 μg per well. Then, enzyme-linked immunosorbent assay was performed to select the fused cells producing a monoclonal antibody.

As seen from FIG. 1, the antibody inhibited the proliferation of HUVECs by SCF in a concentration-dependent manner.

Figure 2:
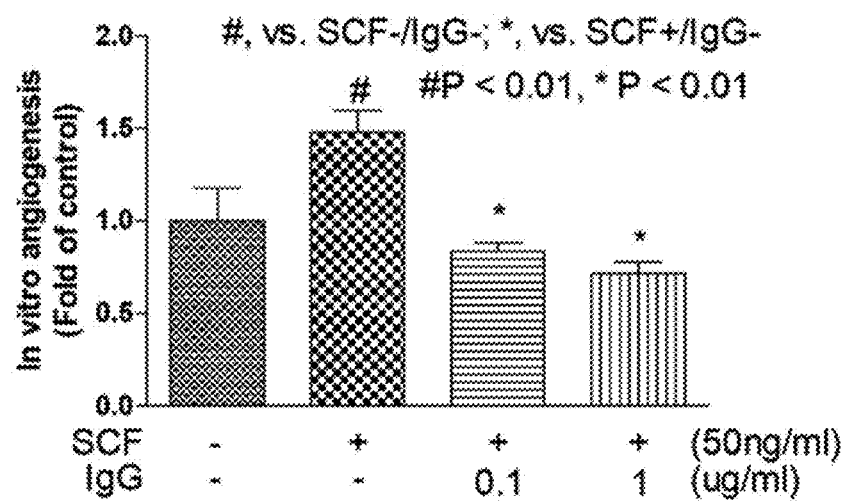
FIG. 2 shows a result of treating HUVECs with a c-kit antibody at different concentrations in order to investigate inhibitory effect on angiogenesis in vitro.

As seen from FIG. 2, when HUVECs were treated with the antibody at different concentrations to investigate the effect on angiogenesis in vitro, the antibody strongly inhibited angiogenesis in vitro even at the concentration of 0.1 μg/mL.

Example 2. Cloning, Isolation and Purification of c-Kit Antibody

1. Antibody Sequence

The sequences of CDR genes encoding the antibody were identified by Genescript as shown in Table 1.

TABLE 1

| | CDR1 | CDR2 | CDR3 |
|---|---|---|---|
| VH | SYYWS (SEQ ID No: 1) | YIFYSGSTNYNPSLKS (SEQ IDNo: 2) | GYSSGWLDFHH (SEQ ID No: 3) |

[MKHLWFFLLLAAPRWVLS: signal peptide]
QVQLQESGPGLVKPSETLSLICTVSGGSIGSYYWSWIROPPOKGL
EWIGYIFYSGSTNYNPSLKSRVTISVDTSKNQFSLKLSSVTAADTA
VYYCARGYSSGWLDFHHIWGQGTLVAVSS (SEQ ID No: 7)

(ATGAAACATCTGTGGTTCTTCCTTCTCCTGGTGGCAGCTCCC
GATGGGTCCTGTCC]
CAGGTGCAGCTGCAGGAGTCGGGCCCAGGACTGGTGAAGCCT
TCGGAGACCCTGTCCCTCACCTGCACTGTCTCTGGTGGCTCCA
TCGGTAGCTACTACTGGAGCTGGATCCGGCAGCCCCAGGGA
AGGGACTGGAGTGGATTGGGTATATCTTTTACAGTGGGAGCAC
CAACTACAACCCCTCCCTCAAGAGTCGAGTCACCATATCAGTA
GACACGTCCAAGAACCAGTTCTCCCTGAAGCTGAGCTCTGTG
ACCGCTGCCGACACGCCCGTGTATTACTGTGCGAGAGGGTATA
GCAGTGGCTGGTTAGACTTCCACCACTGGGGCCAGGGCACCC
TGGTCGCCGTCTCCTCA (SEQ ID No: 9)

TABLE 1-continued

| VL | RASQSISSYN (SEQ ID No: 4) | AASSLQS (SEQ ID No: 5) | QQSYSTPTT (SEQ ID No: 6) |
|---|---|---|---|

[MRVPAQLLGLLLLWLRGARC: signal peptide]
DIQMTQSPSSLSASVGDRVTITCRASQSISSYLNWYQQKPGKAPK
LLIYAASSLQSGVPSRFSGSGSGTDFTLTISSLQPEDFATYYCQQSY
STPITFGQGTRLEIK (SEQ ID No: 8)

[ATGAGGGTCCCCGCTCAGCTCCTGGGGCTCCTGCTACTCTGG
CTCCGAGGTGCCAGATGT)
GACATCCAGATGACCCAGTCTCCATCCTCCCTGTCTGCATCTGT
AGGAGACAGAGTCACCATCACTTGCCGGGCAAGTCAGAGCAT
TAGCAGCTATTTAAATTGGTATCAGCAGAAACCAGGGAAAGCC
CCTAAGCTCCTGATCTATGCTGCATCCAGTTTGCAAAGTGGGG
TCCCATCAAGGTTCAGTGGCAGTGGATCTGGGACAGATTTCAC
TCTCACCATCAGCAGTCTGCAACCTGAAGATTTTGCAACTTAC
TACTGTCAACAGAGTTACAGTACCCCGATCACCTTCGGCCAAG
GGACACGACTGGAGATTAAA (SEQ ID No: 10)

2. Cloning of Fully Humanized Antibody

The variable domain of the anti-c-kit antibody obtained above was grafted onto a human Fc amino acid sequence and cloned into a pCHO vector (Life Technologies).

The light-chain variable domain was fused in the frame for the human kappa constant region; and the heavy-chain variable domain was fused in the frame for the human IgG1 constant region. A leader peptide sequence for secretion of the full-length IgG1 antibody in the medium was added to the two genes to synthesize the gene and then verified again through sequencing. Three clones were selected for testing expression in CHO cells. Glycerol stocks were prepared for the three clones, and a plasmid without endotoxin was prepared for testing expression in CHO cells.

3. Isolation and Purification of Antibody after Transfection into CHO Cells

The plasmid DNA obtained above was transfected into CHO-S cells. One week before the transfection, CHO-S cells (Invitrogen, 10743-029) were transferred into a monolayer culture in the presence of DMEM supplemented with serum. After the cells were dispensed one day before transfection, a DNA-lipofectamine complex was prepared for the transfection sample, and the cells were incubated overnight in a 5% $CO_2$ incubator at 37° C. The cells were incubated for a week while adding a medium once every 2-3 days. Then, the culture was recovered, bonded to protein AIG agarose (Invitrogen), and washed with PBS. Then, after eluting with 0.1 M glycine (pH 2.8), it was neutralized with 1 M Tris-HCl (pH 8.0). After dialysis with PBS, it was stored at −70° C., The isolated and purified 409 antibody was run on 6% SDS-PAGE under non-reducing and reducing conditions to investigate the purity and size of the antibody.

Example 3. Verification of Affinity of c-Kit Antibody

Figure 3:
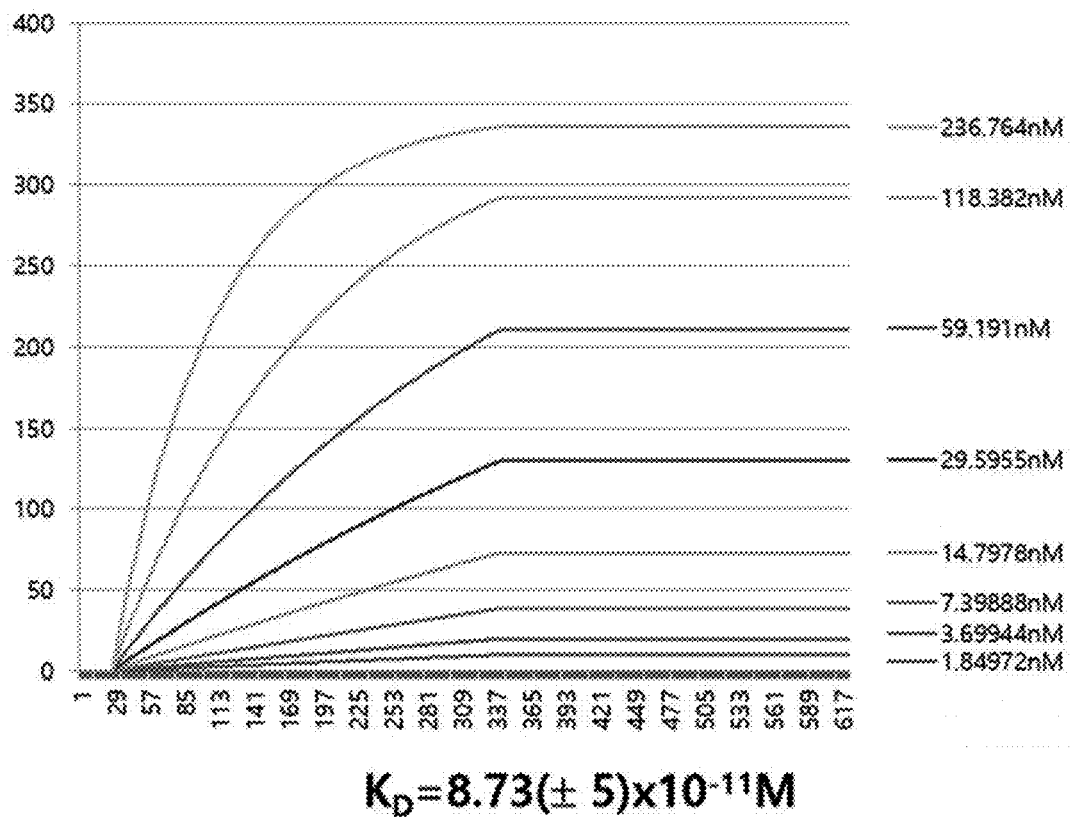
FIG. 3 shows a result of investigating $K_D$ values after treating a c-kit antibody at different concentrations.

SPR was performed to investigate the binding ability of the anti-c-kit antibody to c-kit. Using SR7500DC (Reichert, USA), 20 μg of human c-kit (Elabscience, PKSH030939) used for the preparation of the antibody was fixed on a PEG chip (Reichert, USA). Then, after flowing the antibody at different concentrations, $K_D$ value was analyzed using the Scrubber2 program. The result is shown in FIG. 3.

Example 4. Domain Mapping

Figure 4:
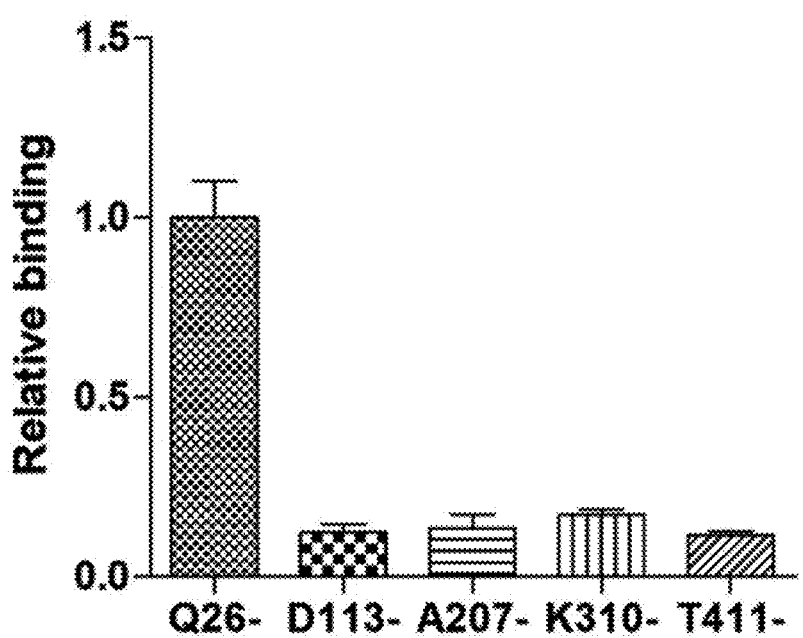
FIG. 4 shows a result of investigating the binding site for c-kit of a c-kit antibody.

The deletion mutants (Q26-P520, D113-P520 Δdomain I, A207-P520 Δdomain I-II, K310-P520 Δdomain I-III, T411-P520 Δdomain I-IV) of the human c-kit gene (NM_000222)

were tagged at the C-terminal with FLAG and then transfected into HEK293 cells. Then, after secretion into a culture, they were purified using FLAG antibody beads (Sigma-Aldrich) and then ELISA was performed. The result is shown in FIG. 4. As seen from FIG. 4, the antibody could not recognize c-kit when the domain I was deleted, suggesting that the binding site of the antibody for c-kit is the domain I.

Example 5. Domain Mapping

The deletion mutants (Q26-P520, R49-P520, I70-P520, K100-P520, K116-P520, N130-P520, S187-P520) of the human c-kit gene (NM_000222, SEQ ID NO: 11) were tagged at the C-terminal with FLAG and then transfected into HEK293 cells. Then, after secretion into a culture, they were purified using FLAG antibody beads (Sigma-Aldrich) and then ELISA was performed.

Figure 5:
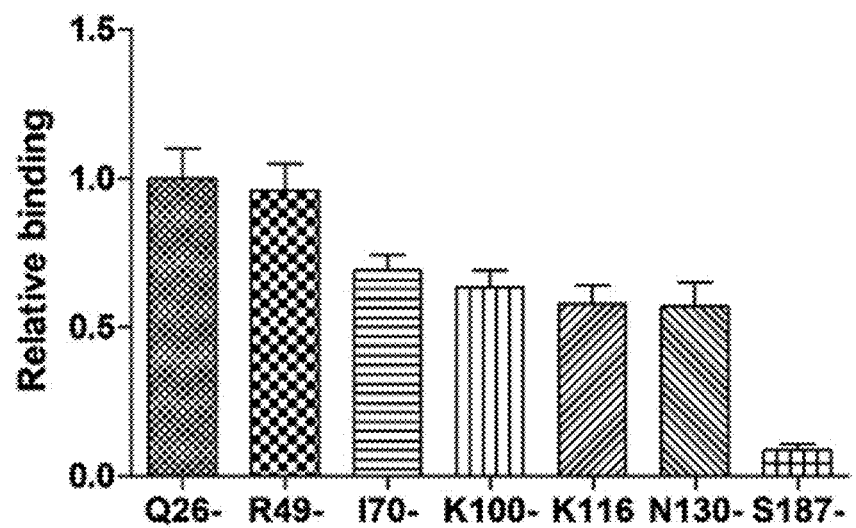
FIG. 5 shows a domain mapping result of a c-kit antibody.

The result is shown in FIG. 5. As seen from FIG. 5, it was confirmed that the antibody binds to the region from R49 of the domain I to C186 of the domain II. It was also found out that it binds to the R122, Y125 and R181 regions of the domain II of SCF (stem cell factor). Therefore, it is thought that the antibody binds competitively to SCF and c-kit.

After coating 20 ng of c-kit on a 96-well plate and performing incubation for 30 minutes at 4° C. with the antibody (5 ng) previously mixed with SCF at different concentrations (2, 5, 10, 20, 50 or 100 μg/mL, 100 μL), competitive ELISA for c-kit was conducted using anti-human IgG-HRP.

Figure 6:
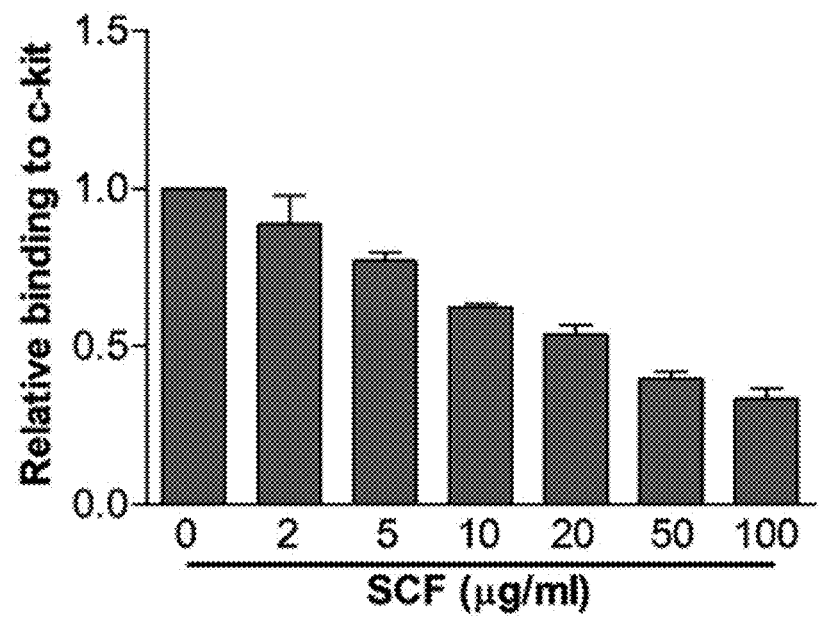
FIG. 6 shows a competitive ELISA result of a c-kit antibody.
Figure 7A:
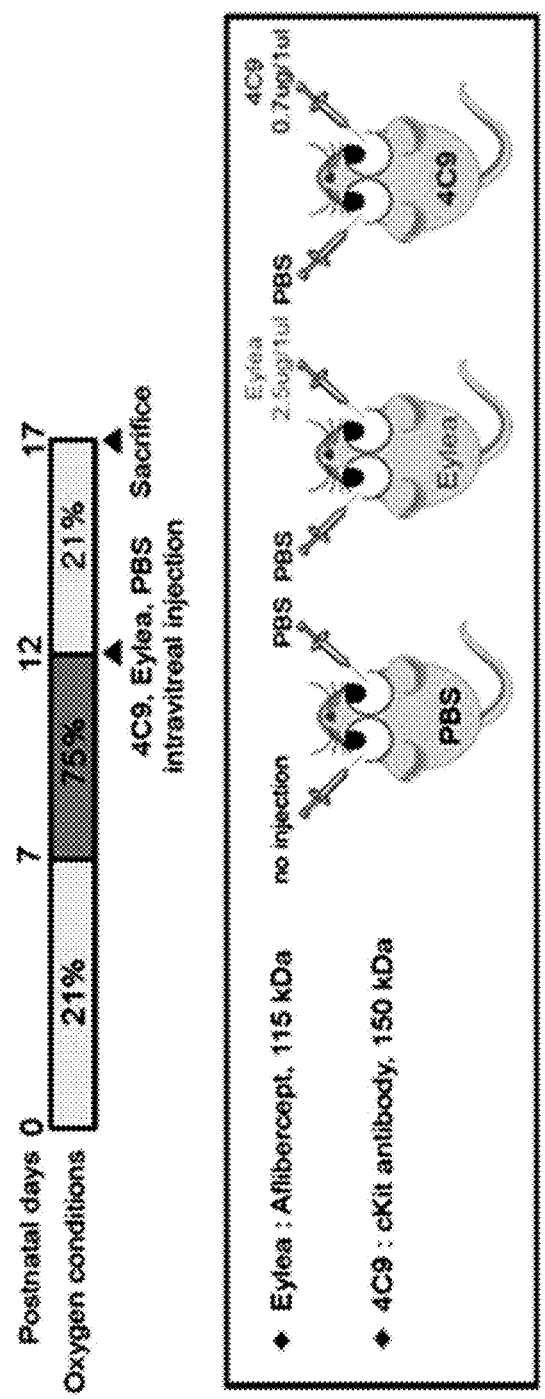
FIGS. 7A to 7D show results of investigating the effect of a c-kit antibody in vivo in an OR mouse model of diabetic retinopathy and retinopathy of prematurity.
Figure 7B:
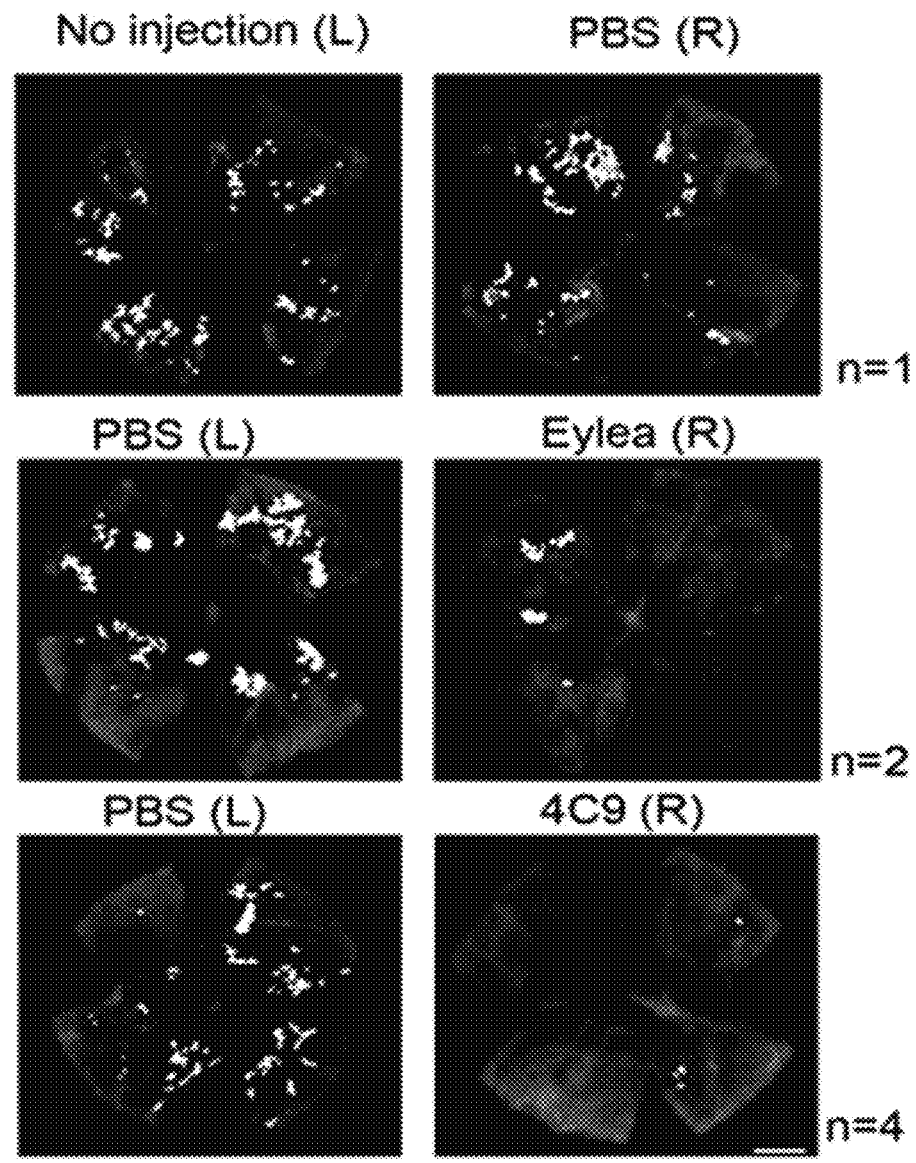
Figure 7C:
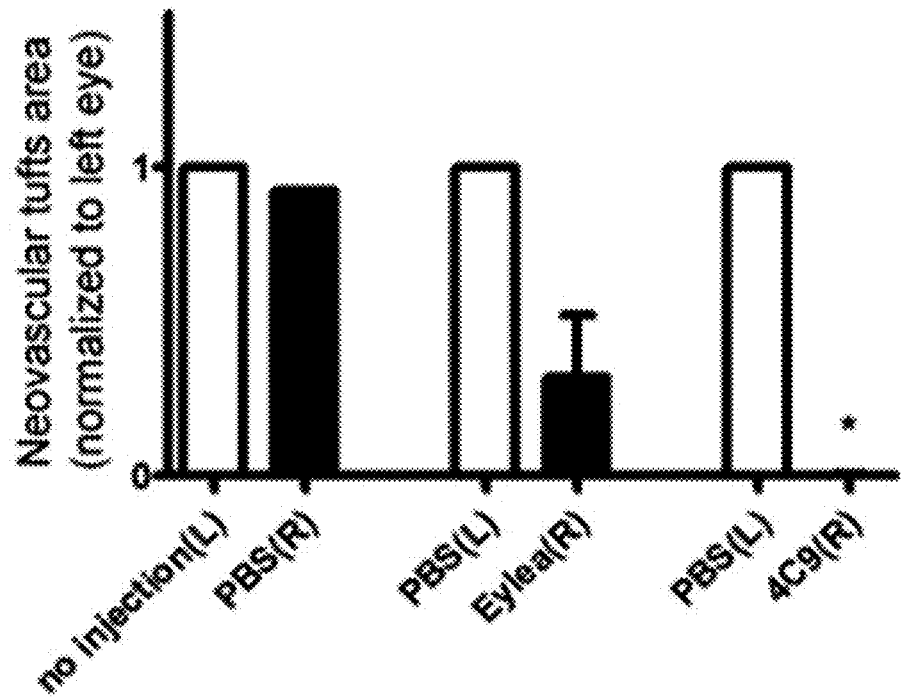
Figure 7D:
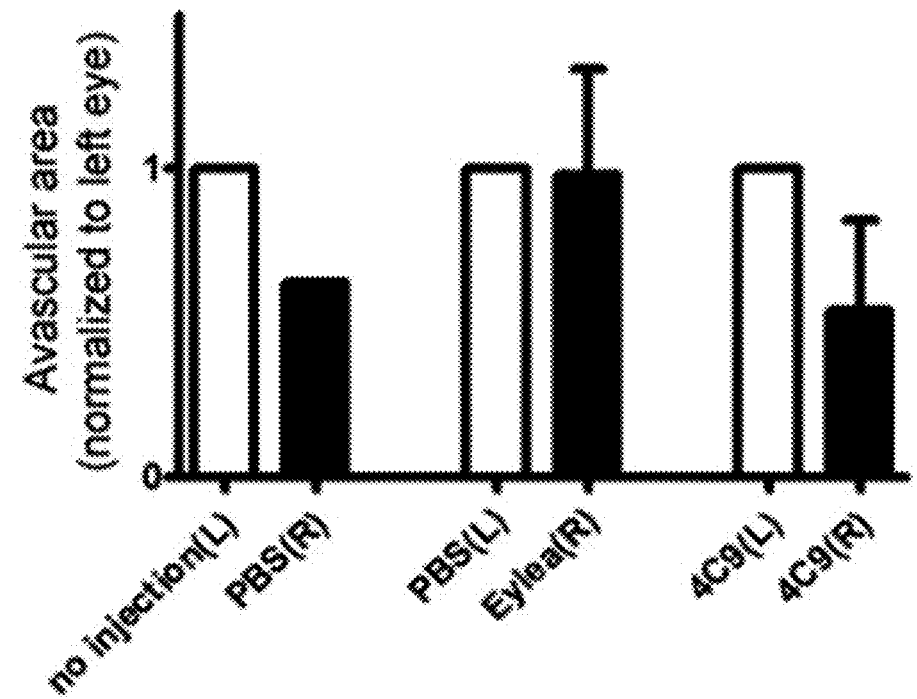

The result is shown in FIG. 6. As seen from FIG. 6, it was confirmed that the antibody binds competitively to SCF and c-kit. The binding of the antibody to c-kit could not be inhibited completely even when the SCF concentration was increased to 100 μg/mL.

Example 6. Verification of Effect In Vivo

A mouse oxygen-induced retinopathy (OIR) model is widely used as an animal model of proliferative diabetic retinopathy and retinopathy of prematurity. C57BL/6 mice were exposed to a 75% high-oxygen environment for 5 days, from day 7 to day 12 after birth. Then, they were exposed to a normal oxygen concentration to form abnormal vessels. It was found out that the c-kit antibody (2 μg/eye) according to the present disclosure inhibits the abnormal angiogenesis at a level superior to that of Eylea (aflibercept) (2 μg/eye) (FIGS. 7A to 7D).

Figure 8:
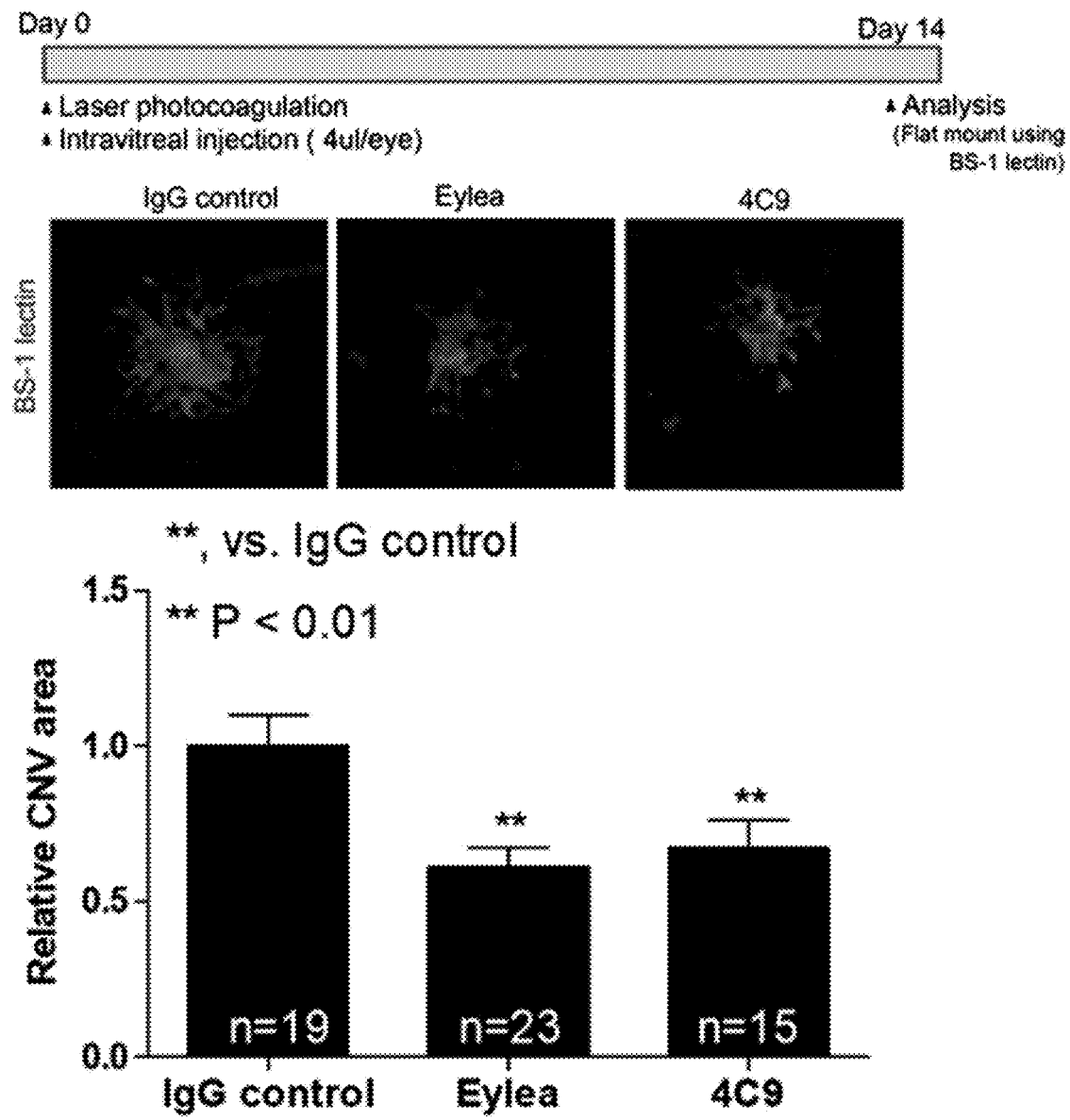
FIG. 8 shows that a c-kit antibody reduces abnormal angiogenesis in a macular degeneration model.

In addition, as a result of inducing CNV (choroidal neovascularization) in brown Norway rats as a macular degeneration model using a laser and intravitreally injecting Eylea and the c-kit antibody of the present disclosure, the 4C9 antibody decreased the abnormal angiogenesis caused by macular degeneration at a level comparable to that of Eylea even at a lower concentration (FIG. 8).

Example 7. Inhibition of SCF/c-Kit Signaling by Antibody

Figure 9:
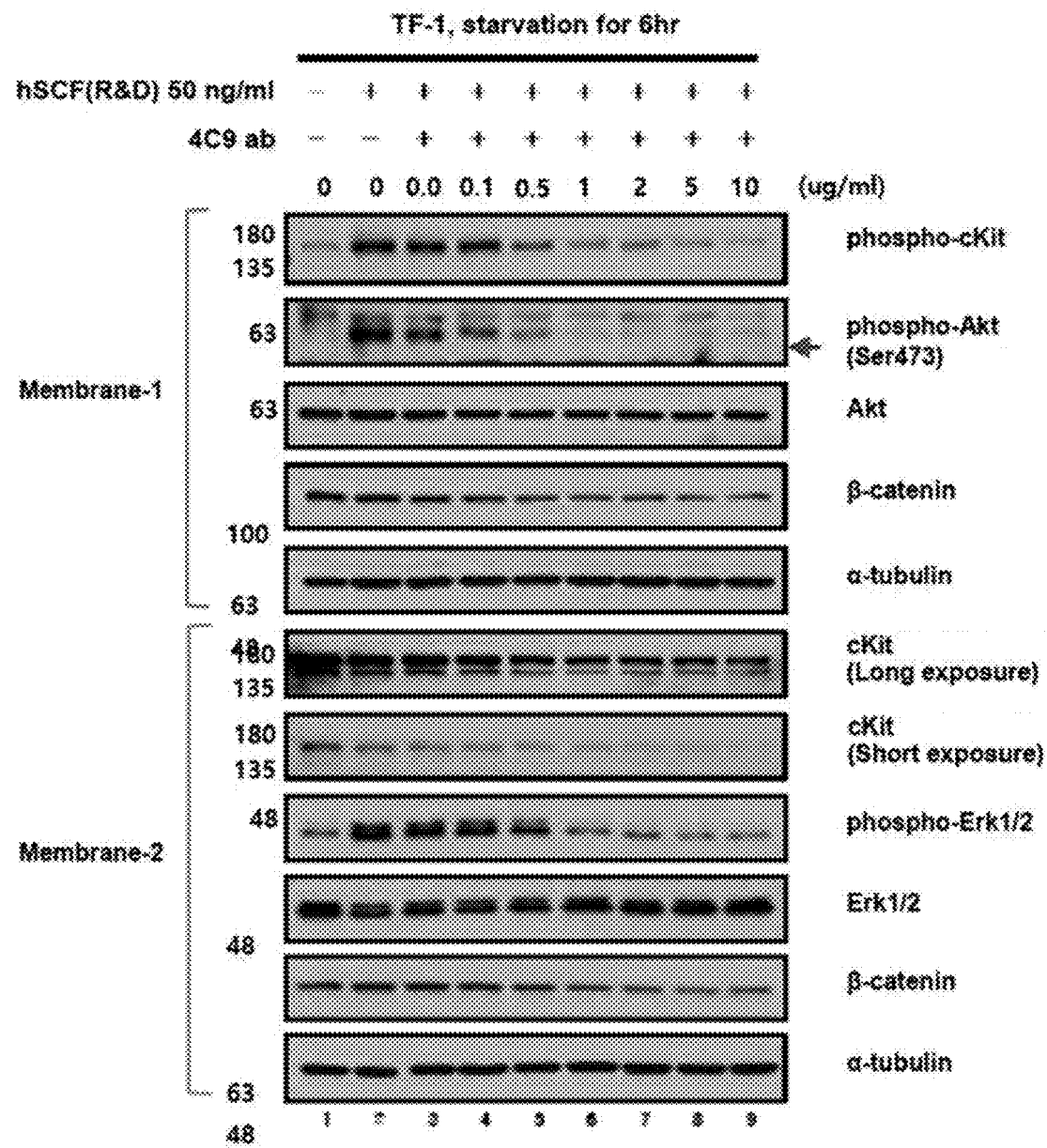
FIG. 9 shows that a c-kit antibody inhibits the phosphorylation of c-kit, akt and ERK and reduces c-kit protein and beta-catenin in a concentration-dependent manner.

SCF/c-kit signaling is known to basically induce the ERK phosphorylation of Akt. When TF-1 leukemic cells were treated with SCF, the phosphorylation of c-kit and the phosphorylation of Akt/ERK were increased, but the phosphorylation of c-kit and the phosphorylation of Akt/ERK were inhibited by the antibody according to the present disclosure. In particular, the antibody decreased the c-kit protein in a concentration-dependent manner (FIG. 9).

Beta-catenin is an Akt downstream signal, and is known as an important factor in cell proliferation. It was confirmed that the antibody according to the present disclosure effectively inhibits the expression of beta-catenin in a concentration-dependent manner (FIG. 9).

Example 8. Inhibitory Effect of Antibody on Proliferation of HUVECs and TF-1 Cells After pretreating TF-1 cells and HUVECs with the antibody at different concentrations for 30 minutes and then treating with 50 ng/mL SCF, cell number was counted 72 hours later in order to compare the cell proliferation rate.

Figure 10:
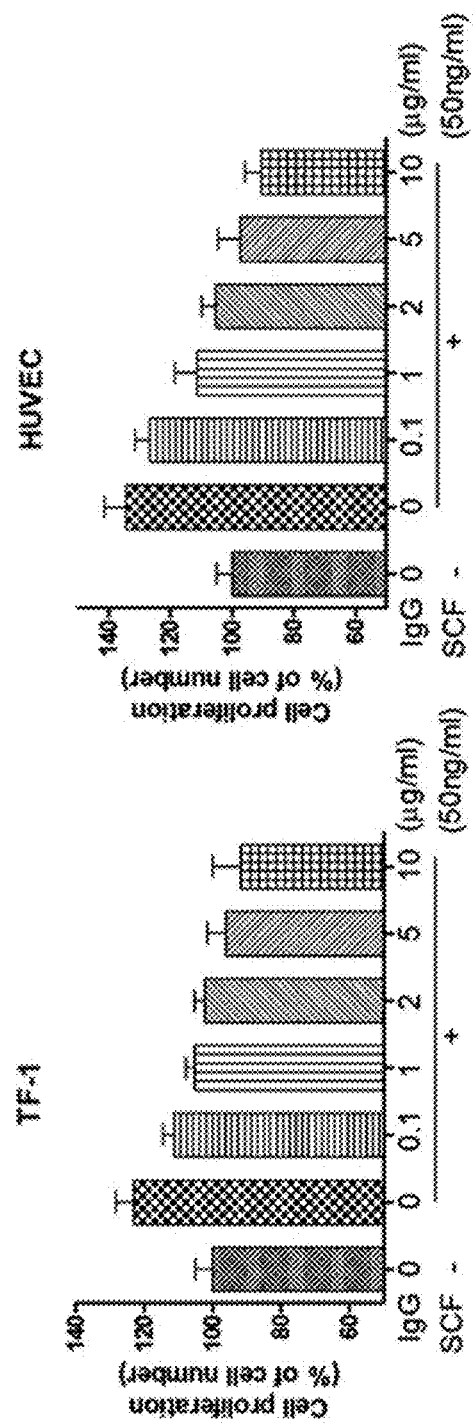
FIG. 10 shows that a c-kit antibody effectively inhibits the proliferation of leukemic cells and vascular endothelial cells by SCF when treated at different concentrations.

The result is shown in FIG. 10. As seen from FIG. 10, SCF increased the number of the TF-1 cells by about 26% and the number of HUVECs by about 30% as compared to a negative control group. In contrast, the antibody effectively inhibited the proliferation of the cells by SCF when treated at various concentrations.

INDUSTRIAL APPLICABILITY

An antibody binding to c-kit according to the present disclosure or antigen-binding fragment thereof can bind to c-kit, particularly to the domain I and/or domain II, with high affinity and can inhibit abnormal angiogenesis at superior level. Therefore, the antibody binding to c-kit according to the present disclosure or antigen-binding fragment thereof can be usefully used to prevent or treat an angiogenic disease.

Although specific exemplary embodiments of the present disclosure have been described in detail above, it will be obvious to those having ordinary knowledge in the art that they are only preferred exemplary embodiments and the scope of the present disclosure is not limited by them. It is to be noted that the substantial scope of the present disclosure is defined by the appended claims and their equivalents.

SEQUENCE LIST TEXT

E-file attached.

The invention claimed is:

1. An antibody binding to c-kit or antigen-binding fragment thereof, comprising:
   a heavy-chain CDR1 comprising the sequence of SEQ ID NO: 1,
   a heavy-chain CDR2 comprising the sequence of SEQ ID NO: 2,
   a heavy-chain CDR3 comprising the sequence of SEQ ID NO: 3,
   a light-chain CDR1 comprising the sequence of SEQ ID NO: 4,
   a light-chain CDR2 comprising the sequence of SEQ ID NO: 5, and
   a light-chain CDR3 comprising the sequence of SEQ ID NO: 6.

2. The antibody or antigen-binding fragment thereof according to claim 1, wherein the antibody specifically binds to a region from R49 of domain I to C186 of domain II in c-kit of SEQ ID NO: 11.

3. The antibody or antigen-binding fragment thereof according to claim 1, wherein the antibody is an antibody comprising a heavy-chain variable region comprising a sequence having 90% or higher sequence homology to the sequence of SEQ ID NO: 7.

4. The antibody or antigen-binding fragment thereof according to claim 1, wherein the antibody is an antibody comprising a light-chain variable region comprising a sequence having 90% or higher sequence homology to the sequence of SEQ ID NO: 8.

5. A nucleic acid encoding the antibody or antigen-binding fragment thereof according to claim 1.

6. The nucleic acid according to claim 5, which comprises the sequence of SEQ ID NO: 9 or SEQ ID NO: 10.

7. An expression vector comprising the nucleic acid according to claim 5.

8. A cell transformed with the expression vector according to claim 7.

9. A method for preparing an antibody binding to c-kit or antigen-binding fragment thereof, comprising:

(a) a step of culturing the cell according to claim 8; and
(b) a step of recovering an antibody or antigen-binding fragment thereof from the cultured cell.

10. A method for treating an angiogenic disease of a patient in need thereof, comprising administering an effective amount of the antibody or antigen-binding fragment thereof according to claim 1, a nucleic acid encoding the antibody or antigen-binding fragment thereof, or a vector comprising the nucleic acid thereof to the patient.

11. A method for treating cancer, comprising administering an effective amount of the antibody or antigen-binding fragment thereof according to claim 1, a nucleic acid encoding the antibody or antigen-binding fragment thereof or a vector comprising the nucleic acid thereof to a patient in need thereof.

12. The method according to claim 10, wherein the antibody or antigen-binding fragment thereof specifically binds to the domain I and domain II of c-kit.

13. The method according to claim 12, wherein the antibody or antigen-binding fragment thereof specifically binds to a region from R49 of domain I to C186 of domain II in c-kit of SEQ ID NO: 11.

14. The method according to claim 11, wherein the antibody or antigen-binding fragment thereof specifically binds to the domain I and domain II of c-kit.

15. The method according to claim 14, wherein the antibody or antigen-binding fragment thereof specifically binds to a region from R49 of domain I to C186 of domain II in c-kit of SEQ ID NO: 11.

16. A method for inhibiting an abnormal angiogenesis of a patient in need thereof, comprising administering an effective amount of an antibody or antigen-binding fragment thereof according to claim 1 binding to the domain I and domain II of c-kit, a nucleic acid encoding the antibody or antigen-binding fragment thereof, or a vector comprising the nucleic acid thereof to the patient.

17. The method according to claim 16, wherein the antibody or antigen-binding fragment thereof specifically binds to a region from R49 of domain I to C186 of domain II in c-kit of SEQ ID NO: 11.

* * * * *